US011237335B1

(12) United States Patent
Moebius et al.

(10) Patent No.: US 11,237,335 B1
(45) Date of Patent: Feb. 1, 2022

(54) OPTICAL SWITCH CONTROLLABLE BY VERTICAL MOTION MEMS STRUCTURE

(71) Applicant: The Charles Stark Draper Laboratory, Inc., Cambridge, MA (US)

(72) Inventors: Michael G. Moebius, Somerville, MA (US); Steven J. Spector, Lexington, MA (US); Eugene H. Cook, Acton, MA (US); Jonathan J. Bernstein, Medfield, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/586,249

(22) Filed: Sep. 27, 2019

(51) Int. Cl.
*G02B 6/35* (2006.01)

(52) U.S. Cl.
CPC ........... *G02B 6/3518* (2013.01); *G02B 6/356* (2013.01); *G02B 6/357* (2013.01)

(58) Field of Classification Search
CPC ....... G02B 6/3518; G02B 6/356; G02B 6/357
USPC .......................................................... 385/16
See application file for complete search history.

(56) References Cited

U.S. PATENT DOCUMENTS

| 6,212,314 | B1 | 4/2001 | Ford |
| 10,677,594 | B2 | 6/2020 | Scheirich et al. |
| 2003/0223675 | A1 | 12/2003 | Berger et al. |
| 2005/0173235 | A1 | 8/2005 | Nielson et al. |
| 2005/0271324 | A1* | 12/2005 | Nielson ..................... G02B 6/28 385/39 |
| 2010/0209038 | A1 | 8/2010 | Popovic et al. |
| 2016/0327751 | A1 | 11/2016 | Wu et al. |
| 2018/0175961 | A1 | 6/2018 | Spector et al. |
| 2019/0253775 | A1* | 8/2019 | Seok .................. H04Q 11/0005 |

OTHER PUBLICATIONS

Akihama, et al., "Single and Multiple Optical Switches That Use Freestanding Silicon Nanowire Waveguide Couplers," *Light: Science & Applications*, vol. 1, pp. 1-8, 2012.
Campenhout, et al., "Low-Power, 2×2 Silicon Electro-Optic Switch with 110-nm Bandwidth for Broadband Reconfigurable Optical Networks," *Optical Society of America*, vol. 17, No. 26, 10 pages, Dec. 2009.
Evanescent Optics Inc., "The Wave Guide, Modes and Evanescent Tails," Basics, Technical Information 2 pages, Aug. 14, 2018 http://www.evanescentoptics.com/technical-info/?id=.
Han, et al., "Large-Scale Silicon Photonic Switches With Movable Directional Couplers," *Optica*, vol. 2, No. 4, pp. 370-375, Apr. 2015.

(Continued)

*Primary Examiner* — Jerry M Blevins
(74) *Attorney, Agent, or Firm* — Sunstein LLP

(57) ABSTRACT

MEMS-actuated optical switches can be implemented on photonic chips. These switches are compact, essentially planar, simple to implement and include only one moving MEMS component per switch. The switches exhibit low optical loss, require low power to operate, and are simple to control and easy to integrate with other optical devices. Each switch has two optical waveguides that are optically coupled in an ON switch state and not coupled in an OFF switch state. An end or a medial section of one of the two waveguides may translate between the ON and OFF states to affect the coupling. Alternatively, a coupling frustrator may translate between the ON and OFF states to affect the coupling.

14 Claims, 39 Drawing Sheets

(56) References Cited

OTHER PUBLICATIONS

Lee, et al., "Monolithic Silicon Integration of Scaled Photonic Switch Fabrics, CMOS Logic, and Device Driver Circuits," *Journal of Lightwave Technology*, vol. 32, No. 4, pp. 743-751, Feb. 15, 2014.

Lumerical Inc., "Evanescent Coupling," *Lumerical Knowledge Base*, 2 pages, Aug. 14, 2018 https://kb/lumerical.com/en/diffractive_optics_stack_evanescent_coupling.html.

Offrein, "Adiabatic Optic Coupling," *Silicon Photonics*, IBM Zurich, 3 pages, Apr. 22, 2019.

RP Photonics Encyclopedia, "Encyclopedia of Laser Physics and Technology—Effective Refractive Index, Modal Index, Waveguide, Propagation Constant, Mode Overlap," *RP Photonics*, 1 page, Aug. 14, 2018, https://www.rp-photonics.com/effective_refractive_index.html.

RP Photonics Encyclopedia, "Encyclopedia of Laser Physics and Technology—Modes, Waveguide, Propagation Modes, Optical Fiber, Resonator, Field Distributions," *RP Photonics*, 4 pages, Aug. 14, 2018, https://www.rp-photonics.com/modes.html.

RP Photonics Encyclopedia, "Encyclopedia of Laser Physics and Technology—Tapered Fibers, Supercontinuum Generation," *RP Photonics*, 2 pages, Aug. 14, 2018, https://www.rp-photonics.com/tapered_fibers.html.

RP Photonics Encyclopedia, "Encyclopedia of Laser Physics and Technology—Mode Matching, Cavity, Resonator," *RP Photonics*, 1 page, Aug. 14, 2018, https://www.rp-photonics.com/mode_matching.html.

RP Photonics Encyclopedia, "Encyclopedia of Laser Physics and Technology—Cut-Off Wavelength, Modes, Waveguide, Single-Mode Fiber," *RP Photonics*, 1 page, Aug. 14, 2018, https://www.rp-photonics.com/cut_off_wavelength.html.

RP Photonics Encyclopedia, "Encyclopedia of Laser Physics and Technology—Nanofibers, Photonic Nanowires, Sub-Wavelength Fibers, Optical Fiber," *RP Photonics*, 1 page, Aug. 14, 2018, https://www.rp-photonics.com/nanofibers.html.

RP Photonics Encyclopedia, "Encyclopedia of Laser Physics and Technology—Total Internal Reflection, TIR, Critical Angle, Evanscent Wave, Frustrated, FTIR," *RP Photonics*, 2 pages, Aug. 14, 2018, http://www.rp-photonics.com/total_internal_reflection.html.

Seok, et al., "Large-Scale Broadband Digital Silicon Photonic Switches with Vertical Adiabatic Couplers," *Optica*, vol. 3, No. 1, pp. 64-70, Jan. 2016.

Tran, et al., "A Broadband Optical Switch Based on Adiabatic Couplers," *IEEE*, pp. 755-756, 2016.

Wikipedia, "Transverse Mode," *Wikipedia*, 2 pages, Aug. 14, 2018, https://en.wikipedia.org/wiki/Transverse_mode.

Wikipedia, "Evanescent Field," *Wikipedia*, 2 pages, Aug. 14, 2018, https://en.wikipedia.org/wiki/Evanescent_field.

\* cited by examiner (Side view, switch state = OFF)

(Cross-sectional view)

(Cross-sectional view)

(Switch state = ON)

(Top view)

OPTICAL SWITCH CONTROLLABLE BY VERTICAL MOTION MEMS STRUCTURE

CROSS REFERENCE TO RELATED APPLICATIONS

This application is related to U.S. patent application Ser. No. 16/586,098, titled "Optical Switch Controllable by Vertical Motion MEMS Structure," filed on Sep. 27, 2019, the entire contents of which are hereby incorporated by reference herein, for all purposes.

BACKGROUND

Technical Field

The present invention relates to optical switches and, more particularly, to MEMS-actuated optical switches that can be implemented on photonic chips.

Related Art

In many integrated photonic applications, a binary optical switch is needed to direct light from an input waveguide to one of two output waveguides. In some applications, several binary optical switches are interconnected to form 1×N, N×M or other types of optical switching networks. Ideally, a binary optical switch should: have low optical loss, regardless of which output the light is coupled to; require low power to operate; and be compact, simple to control and easy to integrate with other optical devices.

Examples of systems that may include optical switches include light detection and ranging (sometimes referred to as laser imaging, detection and ranging) (LiDARs) and image projectors. Such a system emits or receives a (humanly visible or invisible) collimated optical beam in a direction that can be controlled with high precision, and often these beams need to be steered or swept to locate or track a target. Similarly, laser communications systems sometimes need to steer an optical beam, such as to initially establish a line-of-sight communications channel between two terminals, or later to track if one or both of the terminals move. Modern optical systems often require compact, essentially planar, optical switching networks implemented on photonic chips, such as to drive arrays of emitters for LiDARs and image projectors. See, for example, U.S. Pat. Publ. No. 2018/0175961, titled "Integrated MEMS Switches for Selectively Coupling Light In and Out of a Waveguide," the entire contents of which are hereby incorporated by reference herein, for all purposes.

A common method for implementing an optical switch in an integrated photonic circuit involves use of a Mach-Zehnder interferometer and a phase shifter. In such a circuit, relative phase of two arms directs light to a selected output. The phase shift may be implemented and controlled in several known ways, such as thermal tuning. Phase shifter-based Mach-Zehnder switches are analog devices, which can switch arbitrary amounts of power between two outputs. For many applications, this is advantageous, but for applications where binary switching is desired, very accurate control of the phase between the two arms is necessary to get low loss and good extinction. Such accurate phase control requires a complicated control system, particularly when environment factors, such as temperature, can affect the phase of light propagation.

Tae Joon Seok, et al., "Large-scale broadband digital silicon photonic switches with vertical adiabatic couplers," Optica, Vol. 3, No. 1, pp. 64-70, January, 2016, ("Seok") and Tae Joon Seok, et al., "Large-scale broadband digital silicon photonic switches with vertical adiabatic couplers: supplemental material" ("Seok Supplement") describe a MEMS-actuated optical switching matrix made up of multiple perpendicularly crossing, normally non-coupled waveguides. Sangyoon Han, et al., "Large-scale silicon photonic switches with movable directional couplers," Optica, Vol. 2, No. 4, pp. 370-375, April, 2015 ("Han") discloses another MEMS-actuated optical switching matrix made up of multiple perpendicularly crossing, normally non-coupled waveguides. In Seok and Han, a respective switch cell is disposed at each waveguide crossing. When a switch cell is activated, the switch cell bidirectionally couples the two crossing waveguides. Thus, the switching matrix can act as a cross-bar switch, in which each row of the switching matrix can be coupled to a desired column of the switching matrix.

However, each Seok switch cell requires a pair of back-to-back adiabatic couplers on respective MEMS actuators, and each Han switch cell requires a pair of back-to-back resonant couplers on a MEMS actuator. In each case, the two couplers are distinct from the crossing waveguides, and in Seok, the two couplers can be actuated independently. To turn ON a switch cell, both couplers must be moved, so that each of the two couplers is proximate a respective one of the two crossing waveguides. In the ON state, light from one of the two crossing waveguides couples into one of the couplers. The light then propagates to the other coupler, and then the light couples from the other coupler into the other of the two crossing waveguides. Thus, two evanescent couplings are required in an ON switch cell, which introduces loss. The two perpendicular waveguides are immobile. Only the couplers move. The couplers are not physically part of any of the waveguides. The couplers do not extend beyond the switch cell. In contrast, each waveguide extends beyond the switch cell, in both directions. Each switch cell is bidirectional, i.e., light can propagate in either direction, or both directions simultaneously, through an ON switch cell between two crossing waveguides.

However simpler optical switches, with less loss, and that can be implemented on photonic chips, would be preferred.

SUMMARY OF EMBODIMENTS

An embodiment of the present invention provides an optical switch. The optical switch has a design wavelength. The optical switch includes a photonic chip. A first input/output port includes a first optical waveguide disposed on the photonic chip. A second input/output port includes a second optical waveguide, distinct from the first optical waveguide, and disposed on the photonic chip. A first end portion of the second optical waveguide is disposed proximate a medial portion of the first optical waveguide.

A MEMS structure is disposed on the photonic chip. The MEMS structure has a translatable portion configured to translate in response to a control signal.

A translatable optical component includes one of: (a) the medial portion of the first optical waveguide and (b) the first end portion of the second optical waveguide. That is, the translatable optical component includes either: (a) the medial portion of the first optical waveguide or (b) the first end portion of the second optical waveguide, but not both (a) and (b) in any given embodiment.

The translatable portion of the MEMS structure is mechanically coupled to, and configured to thereby translate, the translatable optical component between at least a first (ON) position and a second (OFF) position. In the first (ON) position, the medial portion of the first optical waveguide and the first end portion of the second optical waveguide are sufficiently proximate to evanescently couple with each other with a coupling efficiency of at least about 85% at the design wavelength. In the second (OFF) position, the medial portion of the first optical waveguide and the first end portion of the second optical waveguide are sufficiently spaced apart to evanescently couple with each other with a coupling efficiency of at most about 10% at the design wavelength.

In any embodiment, when the translatable optical component is in the first position, the first input/output port may be optically coupled to the second input/output port via a single evanescent coupling. The single evanescent coupling may be between the medial portion of the first optical waveguide and the first end portion of the second optical waveguide. Exactly one of: (a) the medial portion of the first optical waveguide and (b) the first end portion of the second optical waveguide is configured to translate. That is, either: (a) the medial portion of the first optical waveguide is configured to translate or (b) the first end portion of the second optical waveguide is configured to translate, but not both (a) and (b) in any given embodiment.

In any embodiment, the optical switch may have an outer boundary that defines a smallest-sized rectangular area that includes the translatable optical component and the MEMS structure. The first and second input/output ports may be disposed outside the outer boundary. Each end of the first optical waveguide may be disposed outside the outer boundary. The medial portion of the first optical waveguide may be disposed within the outer boundary. The first end portion of the second optical waveguide may be disposed within the outer boundary. A second end of the second optical waveguide, opposite the first end portion, may be disposed outside the outer boundary. The MEMS structure may be disposed within the outer boundary.

In any embodiment, the translatable optical component may include the medial portion of the first optical waveguide.

In some embodiments, in both the first and second positions, the medial portion of the first optical waveguide are registered above, as viewed normal to the photonic chip, the first end portion of the second optical waveguide. The medial portion of the first optical waveguide may be configured to translate, relative to the photonic chip, in a plane that intersects the first end portion of the second optical waveguide.

In some embodiments, the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

In some embodiments, the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

In some embodiments, in both the first and second positions, the medial portion of the first optical waveguide are laterally displaced, as viewed normal to the photonic chip, from the first end portion of the second optical waveguide. The medial portion of the first optical waveguide may be configured to translate in a plane that does not intersect the first end portion of the second optical waveguide.

In some embodiments, the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

In some embodiments, the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

In some embodiments, the translatable optical component includes the first end portion of the second optical waveguide.

In some embodiments, in both the first and second positions, the first end portion of the second optical waveguide is registered above the medial portion of the first optical waveguide. The first end portion of the second optical waveguide may be configured to translate, relative to the photonic chip, in a plane that intersects the medial portion of the first optical waveguide.

In some embodiments, the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

In some embodiments, the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

In some embodiments, in both the first and second positions, the first end portion of the second optical waveguide is laterally displaced, as viewed normal to the photonic chip, from the medial portion of the first optical waveguide. The first end portion of the second optical waveguide may be configured to translate in a plane that does not intersect the medial portion of the first optical waveguide.

In some embodiments, the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

In some embodiments, the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

Another embodiment of the present invention provides an optical switch. The optical switch has a design wavelength. The optical switch includes a photonic chip and a translatable optical coupling frustrator.

A first optical waveguide is disposed on the photonic chip. The first optical waveguide has a medial portion.

A second optical waveguide, distinct from the first optical waveguide, is disposed on the photonic chip. The second optical waveguide has a first end portion. The first end portion is immobile, relative to the medial portion of the first optical waveguide. The first end portion is sufficiently proximate the medial portion of the first optical waveguide to evanescently couple, absent the optical coupling frustrator, with the medial portion of the first optical waveguide with a coupling efficiency of at least about 85% at the design wavelength.

A MEMS structure is disposed on the photonic chip. The MEMS structure has a translatable portion mechanically coupled to the optical coupling frustrator. The MEMS structure is configured to translate, in response to a control signal, the optical coupling frustrator between at least a first position and a second position. The first position is proximate at least one of the medial portion of the first optical waveguide and the first end portion of the second optical waveguide. That is, in the first position, the optical coupling frustrator is proximate the medial portion of the first optical waveguide and/or the first end portion of the second optical waveguide. The second position is spaced apart from the at least one of the medial portion of the first optical waveguide and the first end portion of the second optical waveguide.

In the first position, the optical coupling frustrator is sufficiently proximate the medial portion of the first optical waveguide and/or the first end portion of the second optical waveguide to prevent evanescent coupling between the medial portion of the first optical waveguide and the first end portion of the second optical waveguide with a coupling efficiency of more than about 10% at the design wavelength. In the second position, the optical coupling frustrator is sufficiently spaced apart from the medial portion of the first optical waveguide and/or the first end portion of the second optical waveguide to allow evanescent coupling between the medial portion of the first optical waveguide and the first end portion of the second optical waveguide with a coupling efficiency of at least about 85% at the design wavelength.

In some embodiments, in both the first and second positions, the optical coupling frustrator is registered above, as viewed normal to the photonic chip, at least a portion of at least one of the medial portion of the first optical waveguide and the first end portion of the second optical waveguide.

In some embodiments, in both the first and second positions, the optical coupling frustrator is displaced laterally, as viewed normal to the photonic chip, from the medial portion of the first optical waveguide and the first end portion of the second optical waveguide.

In some embodiments, in the first position, the optical coupling frustrator is proximate the medial portion of the first optical waveguide and, in the second position, the optical coupling frustrator is spaced apart from the medial portion of the first optical waveguide.

In some embodiments, in the first position, the optical coupling frustrator is proximate the first end portion of the second optical waveguide and, in the second position, the optical coupling frustrator is spaced apart from the first end portion of the second optical waveguide.

BRIEF DESCRIPTION OF THE DRAWINGS

The invention will be more fully understood by referring to the following Detailed Description of Specific Embodiments in conjunction with the Drawings, of which:

FIG. 6 shows the optical switch in an OFF state.

FIG. 10 shows the optical switch in the OFF state, and FIG. 11 shows the optical switch in the ON state.

FIG. 12 shows the optical switch in the OFF state, and FIG. 13 shows the optical switch in the ON state.

FIG. 14 shows the optical switch in an OFF state, and FIG. 15 shows the optical switch in an ON state.

In FIGS. 25 and 26, a translatable portion of a MEMS structure is shown in wire frame. FIG. 25 shows the optical switch in the OFF state, and FIG. 26 shows the optical switch in the ON state.

DETAILED DESCRIPTION OF SPECIFIC EMBODIMENTS

Embodiments of the present invention provide MEMS-actuated optical switches that can be implemented on photonic chips. These optical switches are compact, essentially planar, simple to implement and, unlike Seok, include only one moving MEMS component per optical switch, and unlike Seok or Han, require only one evanescent coupling per ON optical switch. The switches exhibit low optical loss, require low power to operate, and are compact and simple to control and easy to integrate with other optical devices.

Optical Switch—General

Figure 1:
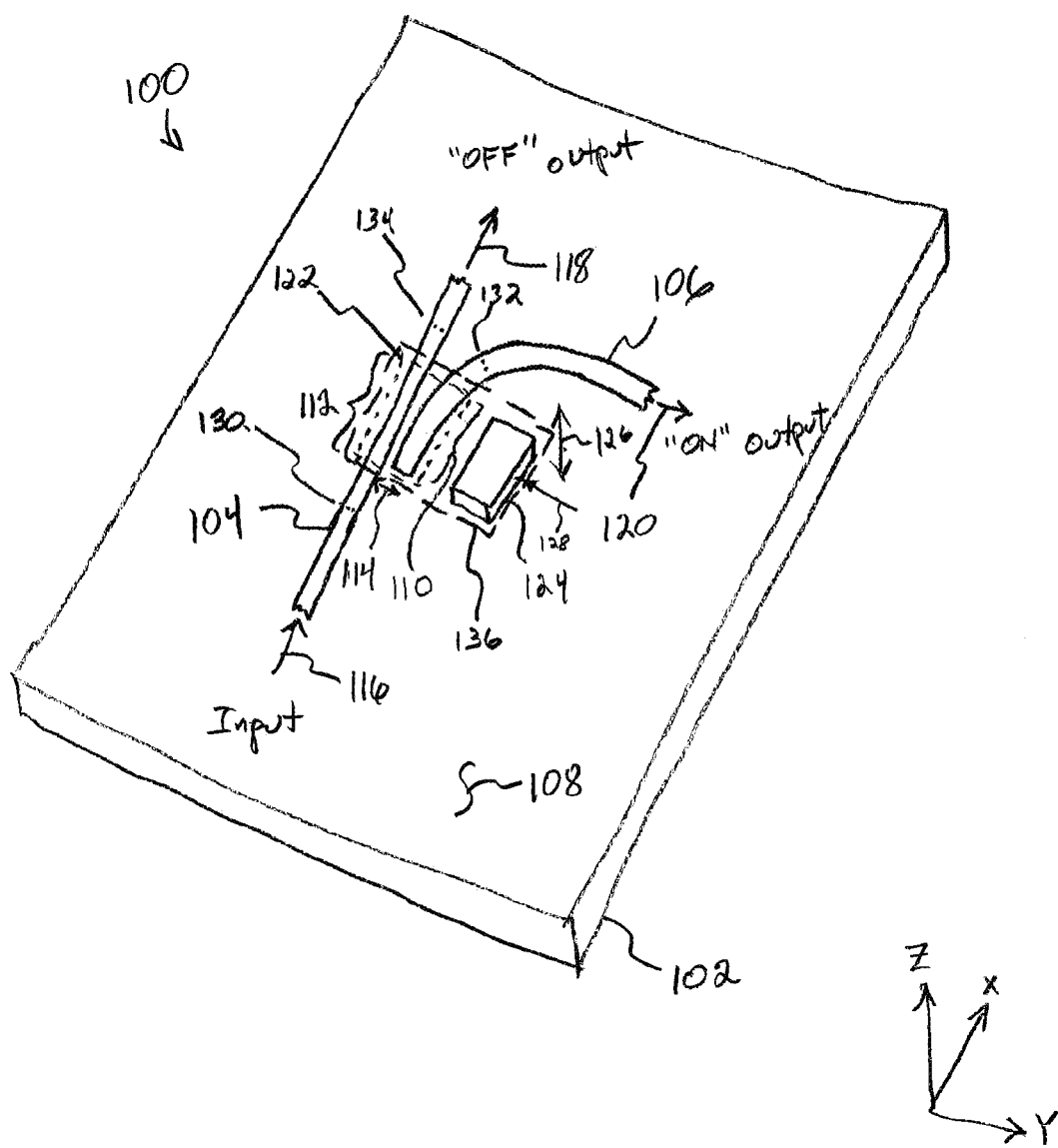
FIG. 1 is a perspective view illustrating general principles of an optical switch, according to several embodiments of the present invention. Subsequent drawings illustrate various aspects of respective embodiments of the switch of FIG. 1.

FIG. 1 is a perspective view of an optical switch 100 fabricated on a photonic chip 102, according to several embodiments of the present invention. General principles of the optical switch 100 are described, with reference to FIG. 1, and various aspects of the optical switch 100 are described below, with reference to other drawings. These aspects include: (a) whether an end portion of one waveguide is next to or above a medial portion of another waveguide, (b) whether the end portion is above or below the medial portion, (c) whether in the ON state the two waveguides are resonantly coupled or adiabatically coupled, (d) the number of possible switch states (for example, a binary ON/OFF optical switch has two states), (e) which optical component translates to change the switch state and (f) the nature of the translatable optical component (for example, whether it is an optical coupler or a coupling frustrator). These aspects may be combined in various ways, some of which are described herein. These aspects, and combinations of the aspects, may vary among embodiments.

The optical switch 100 includes two optical waveguides 104 and 106 and has a design wavelength, which may encompass a range of wavelengths. The waveguides 104 and 106 are attached to the photonic chip 102 and are disposed on, above, or below a surface 108 of the photonic chip 102. The waveguides 104 and 106 are made of suitable materials, sized and fabricated to support propagation of an optical signal within the design wavelength with low loss, as is well known in the art.

Translatable Optical Component Beside Another Waveguide

Relative dispositions of an end portion 110 of the waveguide 106 and a medial portion 112 of the other waveguide 104 represent one aspect of the optical switch 100 that may differ among various embodiments. In the embodiment shown in FIG. 1, the end portion 110 of the waveguide 106 and the medial portion 112 of the other waveguide 104 are disposed laterally next to each other, as viewed from above the photonic chip 102 (normal to the surface 108). That is, the end portion 110 of the waveguide 106 is disposed the same distance from the surface 108 of the photonic chip 102 as the medial portion 112 of the other waveguide 104 is disposed from the surface 108, at least in an ON state, and the end portion 110 of the waveguide 106 is displaced a lateral distance 114, as viewed from above (normal to the surface 108), from the other waveguide 104. Thus, the end portion 110 of one waveguide 106 and the medial portion 112 of the other waveguide 104 lie side by side on the surface 108 of the photonic chip 102, as viewed from above, normal to the surface 108.

Translatable Optical Component Registered Above Another Waveguide

Figure 2:
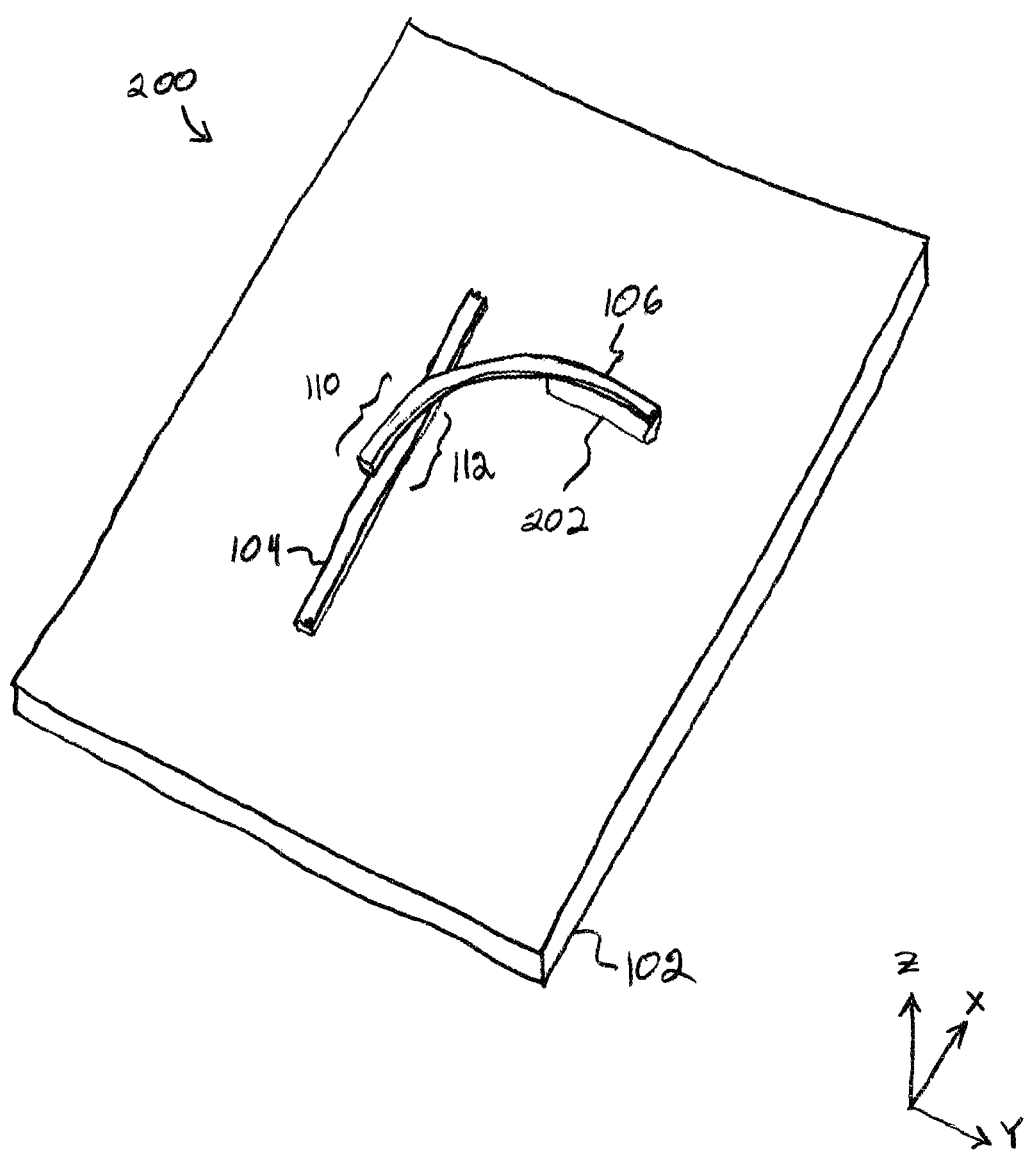
FIG. 2 is a perspective view of one embodiment of the optical switch of FIG. 1, in which an end of one waveguide is disposed directly above a medial portion of another waveguide, according to an embodiment of the present invention.
Figure 3:
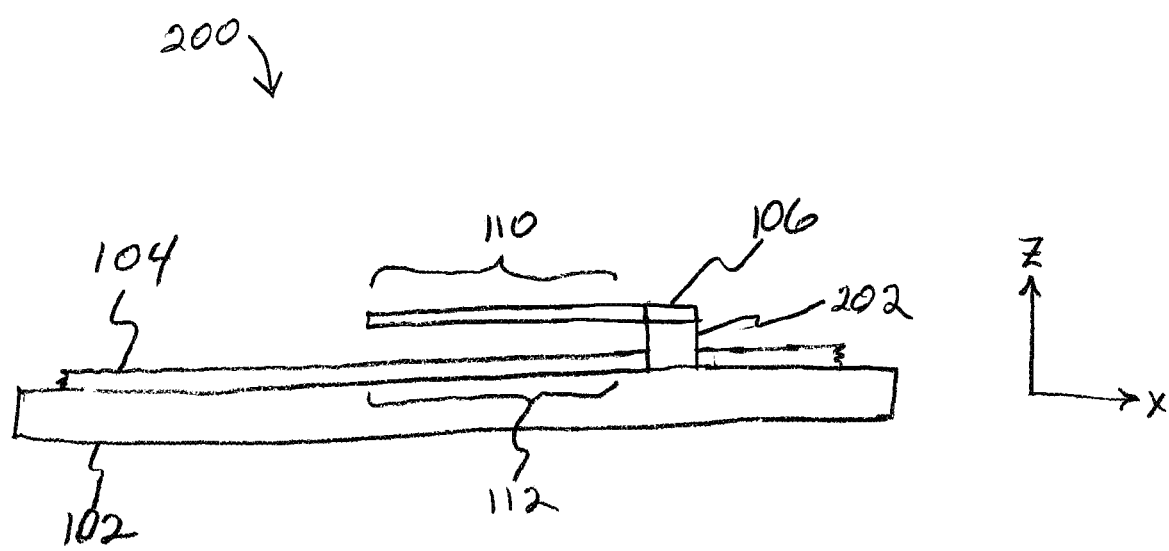
FIG. 3 is a side view of the optical switch of FIG. 2, according to an embodiment of the present invention.

However, in some other embodiments, exemplified by an optical switch 200 shown in FIGS. 2 and 3, the end portion 110 may be disposed and registered above the medial portion 112 of the other waveguide 104, as viewed from above, normal to the surface 108. A support structure 202 elevates and supports the waveguide 106 above the other waveguide 104. Optionally, beyond the optical switch 200, the waveguide 106 can return to the surface 108. We realized that, in some applications, the two waveguides 104 and 106 need not be disposed on the same layer, or similar layers, as in Seok and Han. We also realized that lack of the need for the two waveguides 104 and 106 to be on the same, or a similar, layer allowed us to implement an optical switch with only a single coupler, rather than two couplers per switch cell, as in Seok and Han.

Figure 4:
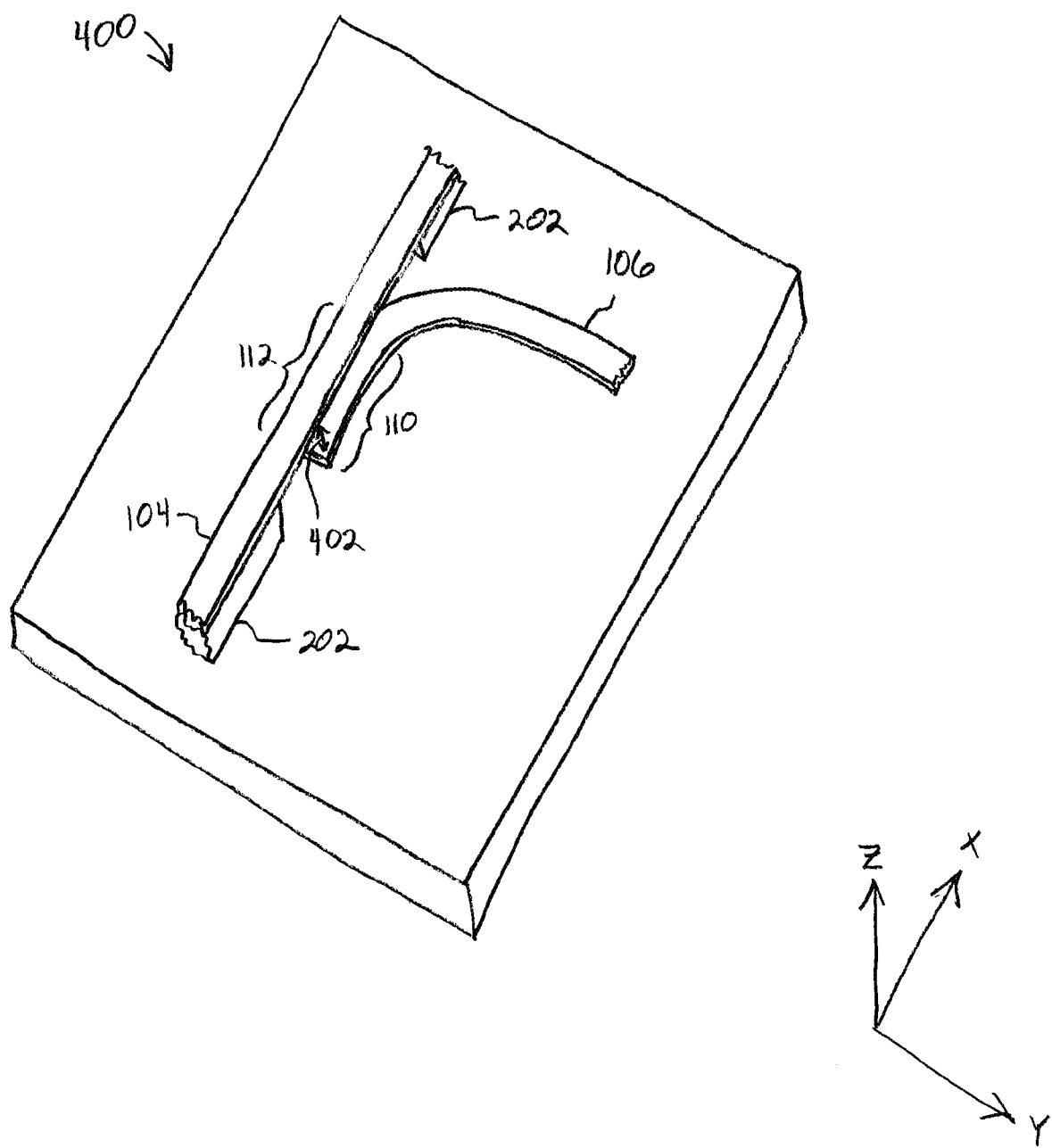
FIG. 4 is a perspective view of another embodiment of the optical switch of FIG. 1, in which an end of one waveguide is disposed directly below the medial portion of the other waveguide, according to an embodiment of the present invention.
Figure 5:
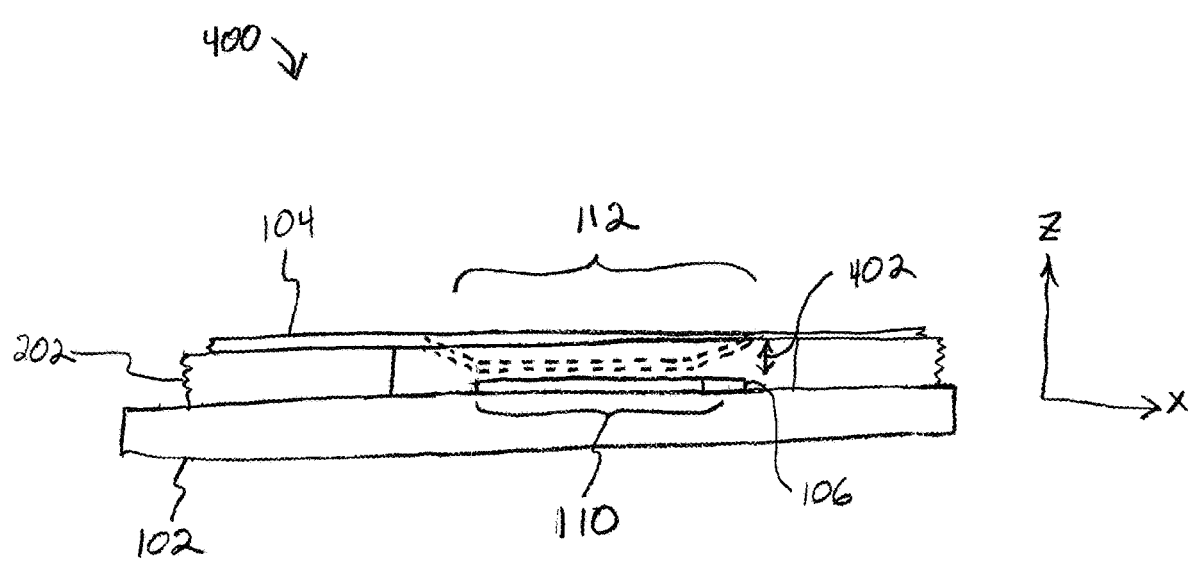
FIG. 5 is a side view of the optical switch of FIG. 4, according to an embodiment of the present invention.

In some other embodiments, exemplified by an optical switch 400 shown in FIGS. 4 and 5, the end portion 110 of the optical waveguide 106 may be disposed and registered below the medial portion 112 of the other waveguide 104, as viewed from above, normal to the surface 108, as discussed in more detail herein.

Returning to FIG. 1, most optical switches 100 are binary, in that they have exactly two states, typically "ON" and "OFF," and switch light from an input path 116 (one of the two optical waveguides 104 or 106) to exactly one of two output paths 118 or 120. One output path 118 may be a continuation of the input path 116 optical waveguide 104, and the other output path 120 typically follows the other optical waveguide 106. Both the input path 118 and the output path 120 extend beyond the optical switch 100. However, one of the two optical paths 118 or 120 terminates within the optical switch 100. That is, only one end of the two optical paths 118 or 120 is disposed within the optical switch 100. In contrast, the back-to-back couplers in a Seok or Han switch cell do not extend beyond the switch cell. That is, both ends of each back-to-back coupler is Seok and Han are disposed with its respective switch cell.

The optical switch 100 includes at least first and second input/output ports 130 and 132, optionally a third input/output port 134, and optionally a fourth input/output port (not shown). Regardless of the number of input/output ports on a given optical switch 100, the input/output ports 130-134 are representative. The input/output ports 130-134 may be defined by cross-sections of their respective optical waveguides 104 and 106, as indicated by dashed lines. The input/output ports 130-134 serve as respective interfaces between the optical switch 100 and other optical components, such as light sources, light detectors or other optical switches (not shown), that are distinct from the optical switch 100. Each input/output port 130-134 provides a means for getting an optical signal into or out of the optical switch 100, from or to another optical component, i.e., other than the optical switch 100. The input/output ports 130-134 are used to inject light into, and receive light from, the optical switch 100.

The optical switch 100 controls how light received via one of the input/output ports 130-134 is directed to other ones of the input/output ports 130-134. As noted, the input/output ports 130-134 serve as respective interfaces to the optical switch 100. Thus, the input/output ports 130-134 are not components through which light propagates within the optical switch 100. Under this definition of input/output port, the translatable optical couplers in Seok or Han are not input/output ports, because each Seok or Han translatable optical coupler is completely internal to a given optical switch cell, and each Seok or Han translatable optical coupler merely conveys light within the optical switch cell, not between the optical switch cell and another optical component. The Seok and Han translatable optical couplers are not interfaces between optical switch cells and other optical components. The ON/OFF nature of the optical switch 100 may be considered to describe whether the light from the input path 116 is, or is not, switched to the output path 120.

In the ON state, the two optical waveguides 104 and 106 are evanescently coupled to each other, at the design wavelength, with an efficiency of at least about 85%, so light propagating along the input waveguide 104 couples into the other waveguide 106, or vice versa, or in both directions, depending on which waveguide(s) 104 and/or 106 act(s) as the input waveguide(s). The coupling occurs in a region 122. The coupling may be resonant coupling and/or adiabatic coupling.

In the OFF state, the two waveguides are not evanescently coupled, or the two waveguides are evanescently coupled with an efficiency of less than about 10%, so light propagating along one of the two waveguides 104 or 106 substantially does not couple into the other waveguide and, instead, continues propagating along the input waveguide. As used herein, a coupling efficiency of less than about 10% is considered not coupled. When the optical switch 100 is in the OFF state, light from the input path 116 propagates along the waveguide 104 to the output path 118. The output path 118 may continue to another optical switch (not shown) or another optical element (not shown), or the output path 118 may terminate beyond the optical switch 100.

Although discussed in the context of binary optical switches, principles disclosed herein, mutatis mutandis, may be used to construct optical switches with more than two states and/or more than two optical paths, and/or optical switches that divide input light among the output paths according to a control signal, such that each output path of a plurality of output paths simultaneously receives a non-zero portion, for example greater than 10%, of the input light. Some such non-binary optical switches are described herein. The number of states of an optical switch is one aspect of the optical switch 100. Whether input light is switched to substantially only one output path or, alternatively, the input light is divided among a plurality of output paths is another aspect of the optical switch 100.

Returning again to FIG. 1, a MEMS structure 124 is disposed on or in the photonic chip 102. At least a portion (not shown) of the MEMS structure 124 is configured to translate, such as along an axis perpendicular to the surface 108 of the photonic chip 102, as indicated by a double-headed arrow 126, in response to a control signal 128. The MEMS structure 124 may include flexures and spaced-apart electrodes (not shown) that are electrostatically attracted to each other, depending on a control voltage (derived from the control signal 128) applied to the electrodes, or an electromagnetic structure, to translate the translatable portion of the MEMS structure 124.

The translatable portion of the MEMS structure 124 is mechanically coupled to a translatable optical component (not shown in FIG. 1, but described in detail herein) and configured to translate the translatable optical component along the axis 126. Translation of the translatable optical component from a first position to a second position causes the optical switch 100 to change from one state to another state, for example, to change from the OFF state to the ON state. Although in FIG. 1 the MEMS structure 124 is shown to the right of both waveguides 104 and 106, in some embodiments (described with respect to other drawings) the MEMS structure 124 is disposed to the left of one or both of the waveguides 106 and 106 and/or above or below one or both of the waveguides 104 and 106.

Figure 6:
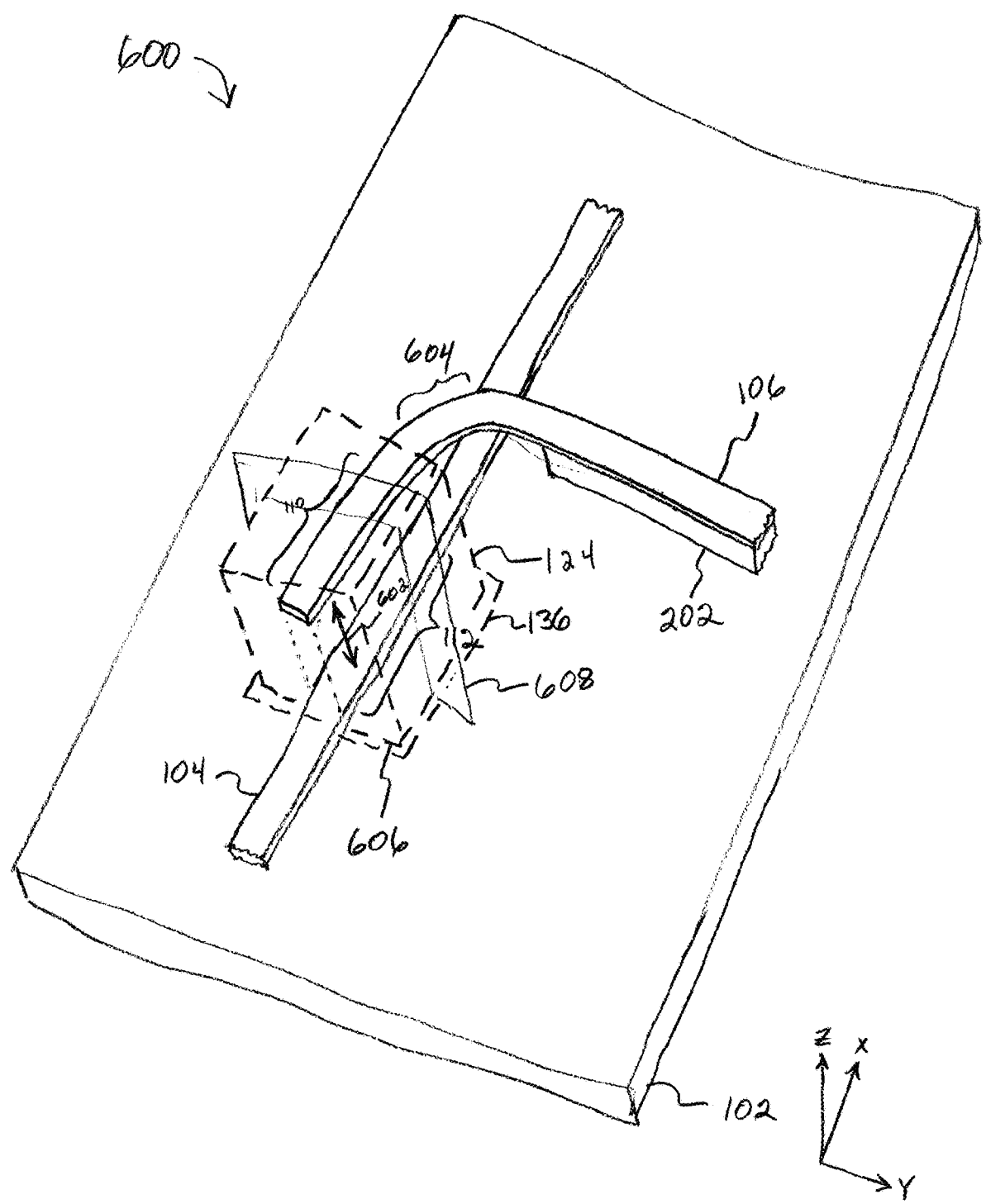
FIG. 6 is a perspective view of yet another embodiment of the optical switch of FIG. 1, in which an end of one waveguide is registered above a medial portion of another waveguide, according to an embodiment of the present invention.

As noted, one aspect of the optical switch 100 involves the relative dispositions of the end portion 110 of one waveguide 106 and the medial portion 112 of the other waveguide 104. FIG. 6 illustrates an optical switch 600, in which the end portion 110 of one waveguide 106 is registered above the medial portion 112 of the other waveguide 104. Thus, in this embodiment, the dispositional aspect of the end portion 110 and the medial portion 112 may be described as registered above.

Figure 7:
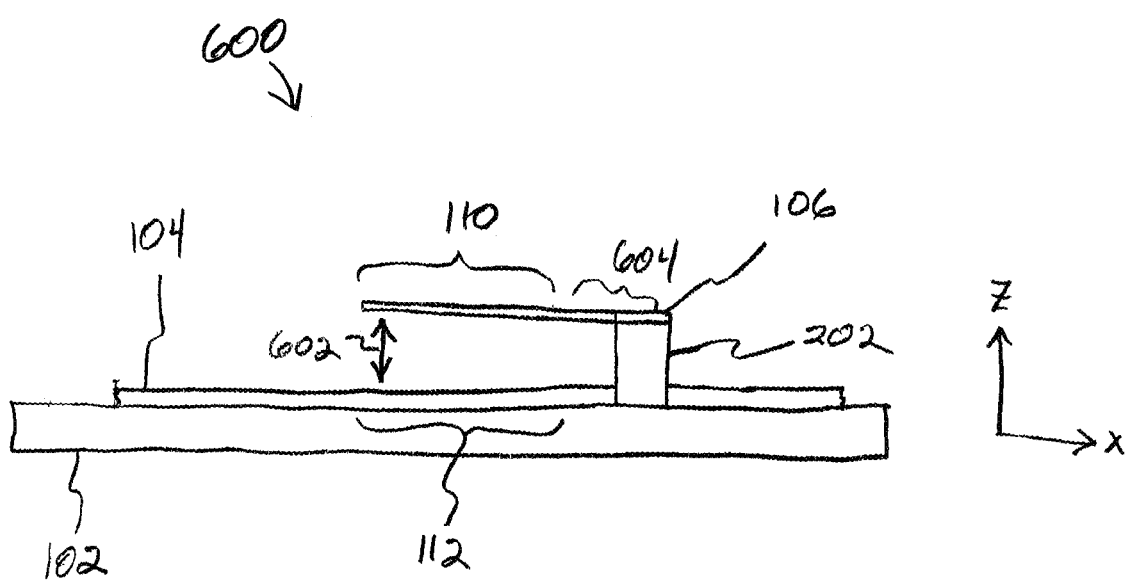
FIG. 7 is a side view of the optical switch of FIG. 6 in the OFF state, according to an embodiment of the present invention.
Figure 8:
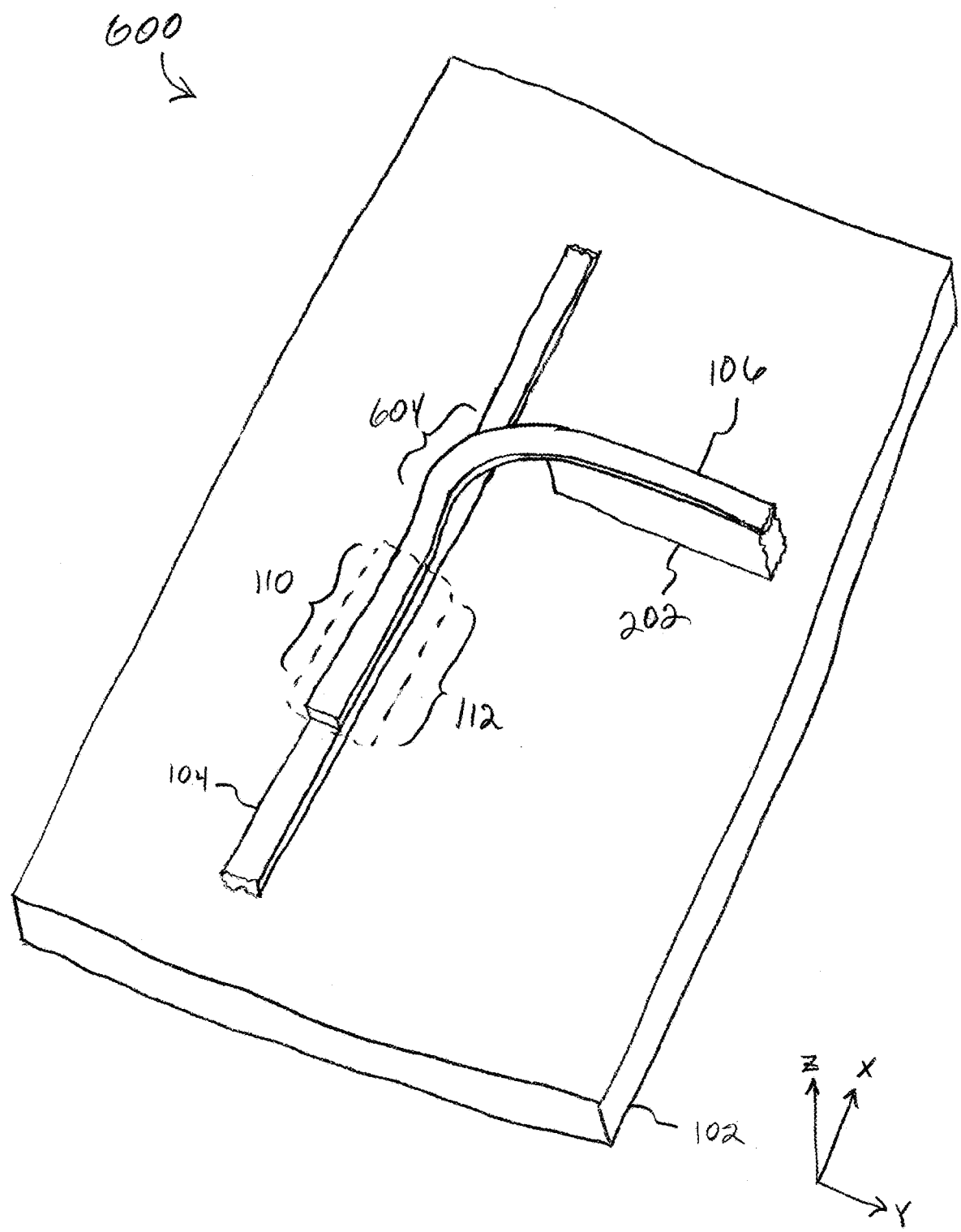
FIG. 8 is a perspective view of the optical switch of FIGS. 6 and 7 showing the optical switch in an ON state, according to an embodiment of the present invention.
Figure 9:
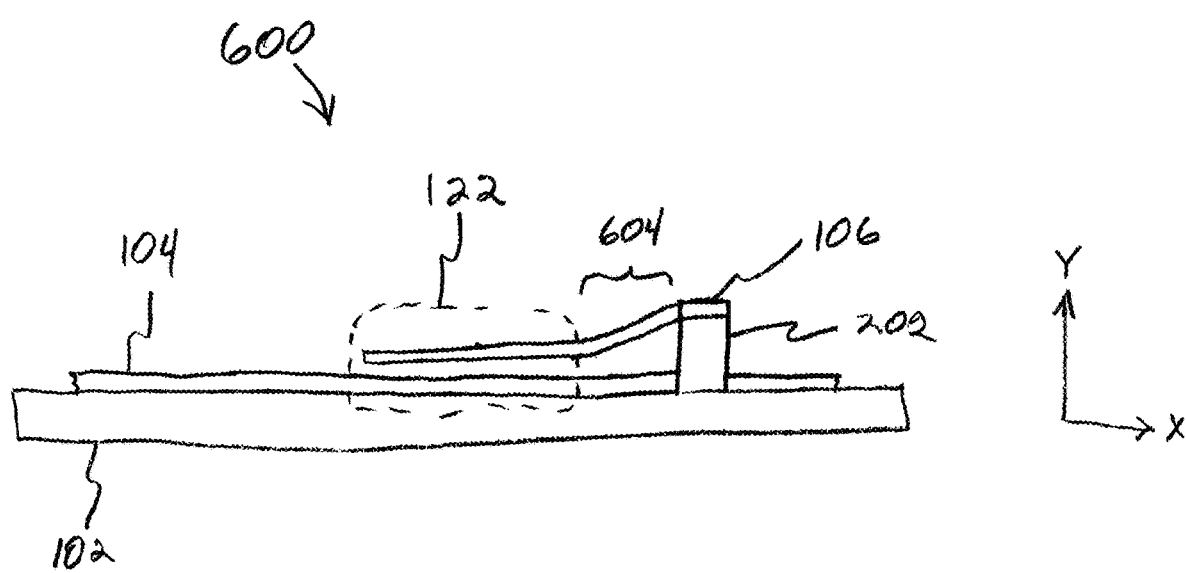
FIG. 9 is a side view of the optical switch of FIGS. 6-8 in the ON state, according to an embodiment of the present invention.

In this embodiment, the end portion 110 is mechanically coupled to the MEMS structure 124 (omitted from FIG. 6 for clarity) and translates, in response to translation of translatable portion of the MEMS structure 124, as indicated by double-headed arrow 602. Thus, in this embodiment, the end portion 110 is the aforementioned translatable optical component. The end portion 110 translates between (a) an OFF position distal from the medial portion 112 (as illustrated in FIGS. 6 and 7) and (b) an ON position proximate the medial portion 112 (as illustrated in FIGS. 8 and 9). A flexible portion 604 facilitates the translation of the end portion 110, while a remaining portion of the waveguide 106 remains immobile, relative to the photonic chip 102.

In the OFF position (FIGS. 6 and 7), the end portion 110 is far enough from the medial portion 112 to prevent coupling between the end portion 110 and the medial portion 112. However, in the ON position (FIGS. 8 and 9), the end portion 110 is sufficiently close to, although not necessarily in intimate contact with, the medial portion 112 to couple between the end portion 110 and the medial portion 112, with a coupling efficiency of at least about 85% at the design wavelength.

In this embodiment, the end portion 110 of the waveguide 106 remains vertically registered above the medial portion 112 of the other waveguide 104 as the end portion 110 translates, regardless whether the end portion 110 is in the OFF or ON position. Thus, the end portion 110 can be described as translating vertically directly above the medial portion 112 of the other waveguide 104.

Figure 10:
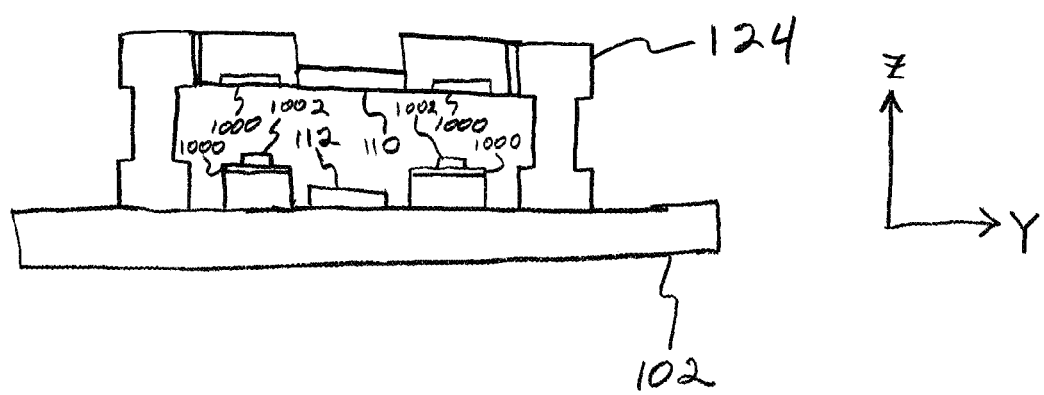
FIGS. 10 and 11 are respective cross-sectional views of the optical switch of FIGS. 6-9, according to an embodiment of the present invention.
Figure 11:
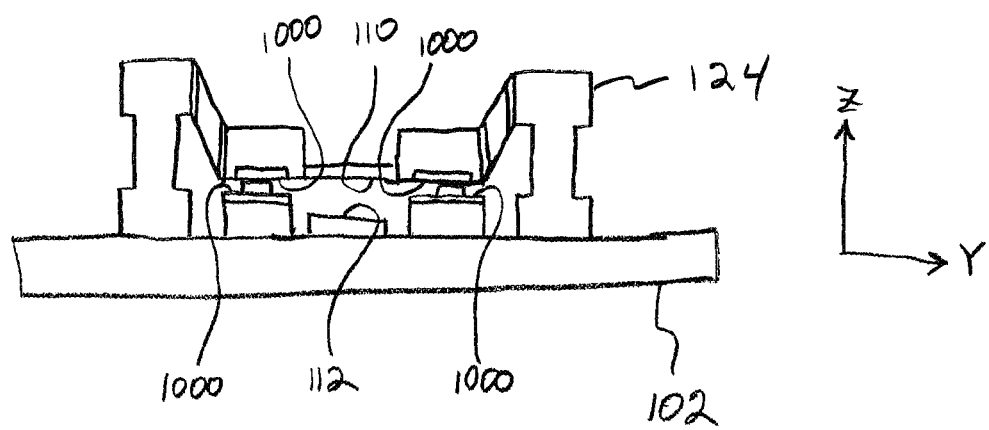
Figure 12:
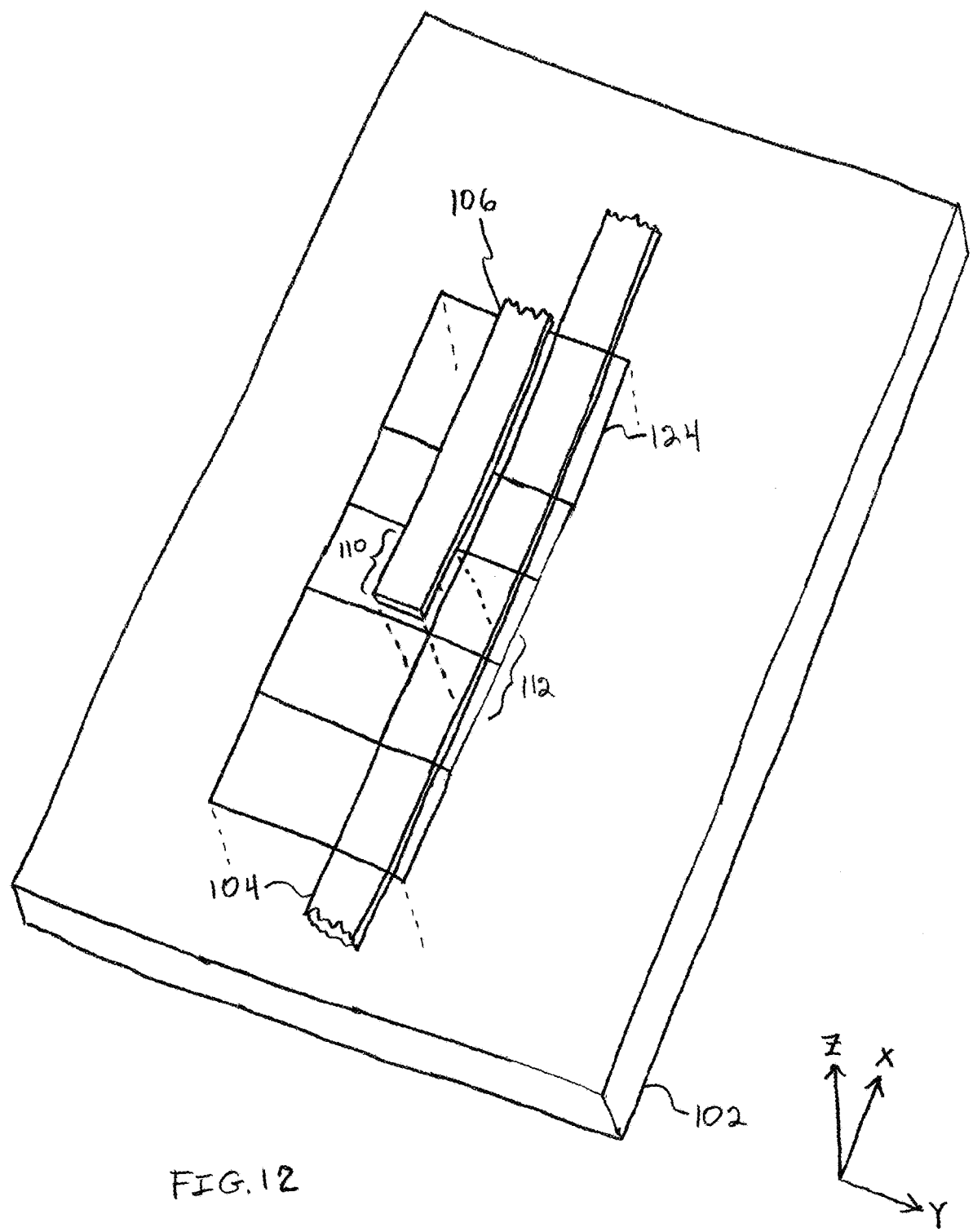
FIGS. 12 and 13 are respective perspective views of the optical switch of FIGS. 6-11, in which a translatable portion of a MEMS structure is shown in wire frame, according to an embodiment of the present invention.
Figure 13:
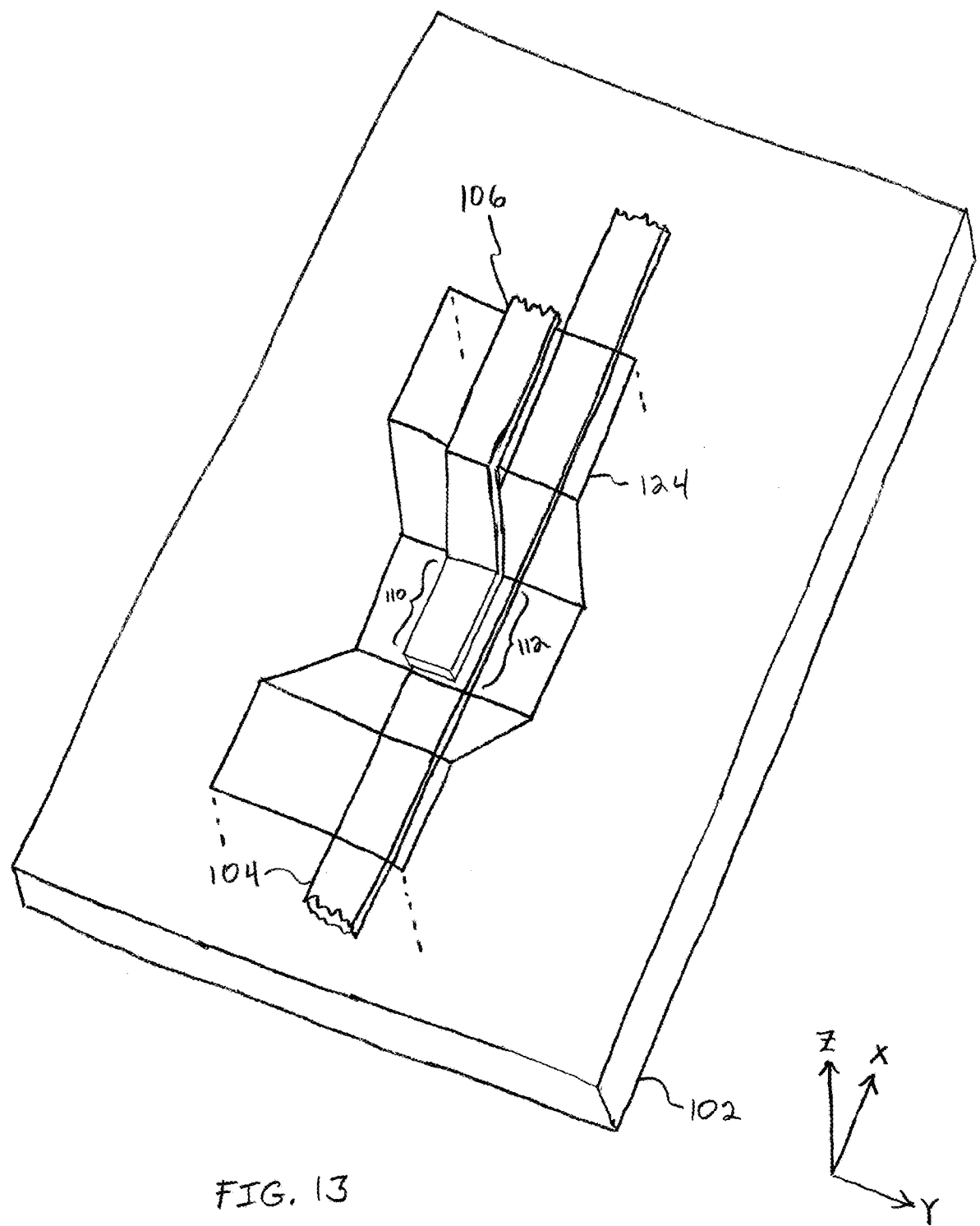

The MEMS structure 124 may define a volume that encloses the end portion 110 of the waveguide 106 and the medial portion 112 of the other waveguide 104, as indicated in FIG. 6 by a dashed rectangular prism 606. FIGS. 10 and 11 are cross-sectional views of the MEMS structure 124, as viewed from section plane 608 (FIG. 6). FIGS. 12 and 13 are simplified perspective illustrations of the optical switch 600 with the translatable portion of the MEMS structure 124 shown as a wire frame. FIGS. 10 and 12 illustrate the MEMS structure 124 when the end portion 110 is in the OFF position, i.e., the optical switch 600 is in the OFF state, and FIGS. 11 and 13 illustrate the MEMS structure 124 when the end portion 110 is in the ON position, i.e., the optical switch 600 is in the ON state.

As shown in FIGS. 10 and 11, the MEMS structure 124 may include counterfacing electrodes 1000 that may be charged to an appropriate voltage to attract, to motivate translation of the end portion 110 between the OFF and ON positions. The MEMS structure 124 should include mechanical stops 1002 to limit travel of the end portion 110, i.e., to ensure a small gap between the end portion 110 and the medial portion 112 in the ON position. The stops should also be designed to have minimal contact area with the moving MEMS element, in order to prevent "stiction" (van der Waals or mirror charge based adhesion). The electrodes 1000, the stops 1002 and other details are omitted from the wire frame illustrations (FIGS. 12 and 13) for simplicity.

Medial Portion of Waveguide Translates

As discussed with respect to FIGS. 4 and 5, in the optical switch 400, the end portion 110 of the waveguide 106 is disposed and registered below the medial portion 112 of the other waveguide 104. A support structure 202 elevates and supports the waveguide 104 above the waveguide 106. In this embodiment, the medial portion 112 translates, as indicated by a double-headed arrow 402, between an OFF position (shown in solid line) and an ON position (shown in dashed line in FIG. 5). In such embodiments, the translatable portion of the MEMS structure 124 (not shown in FIGS. 4 and 5 for clarity) is mechanically coupled to the medial portion 112 to translate the medial portion 112 between the OFF and ON positions. In such embodiments, the medial portion 112 of the waveguide 104 is supported and translated by the translatable portion of the MEMS structure 124. Thus, FIGS. 12 and 13 may be modified to place the medial portion 112 on the wire frame, and the end portion 110 of waveguide 106 below the wire frame. In other respects, the optical switch 400 is similar to the optical switch 600 described herein.

Translatable Optical Component Beside Another Waveguide

Figure 14:
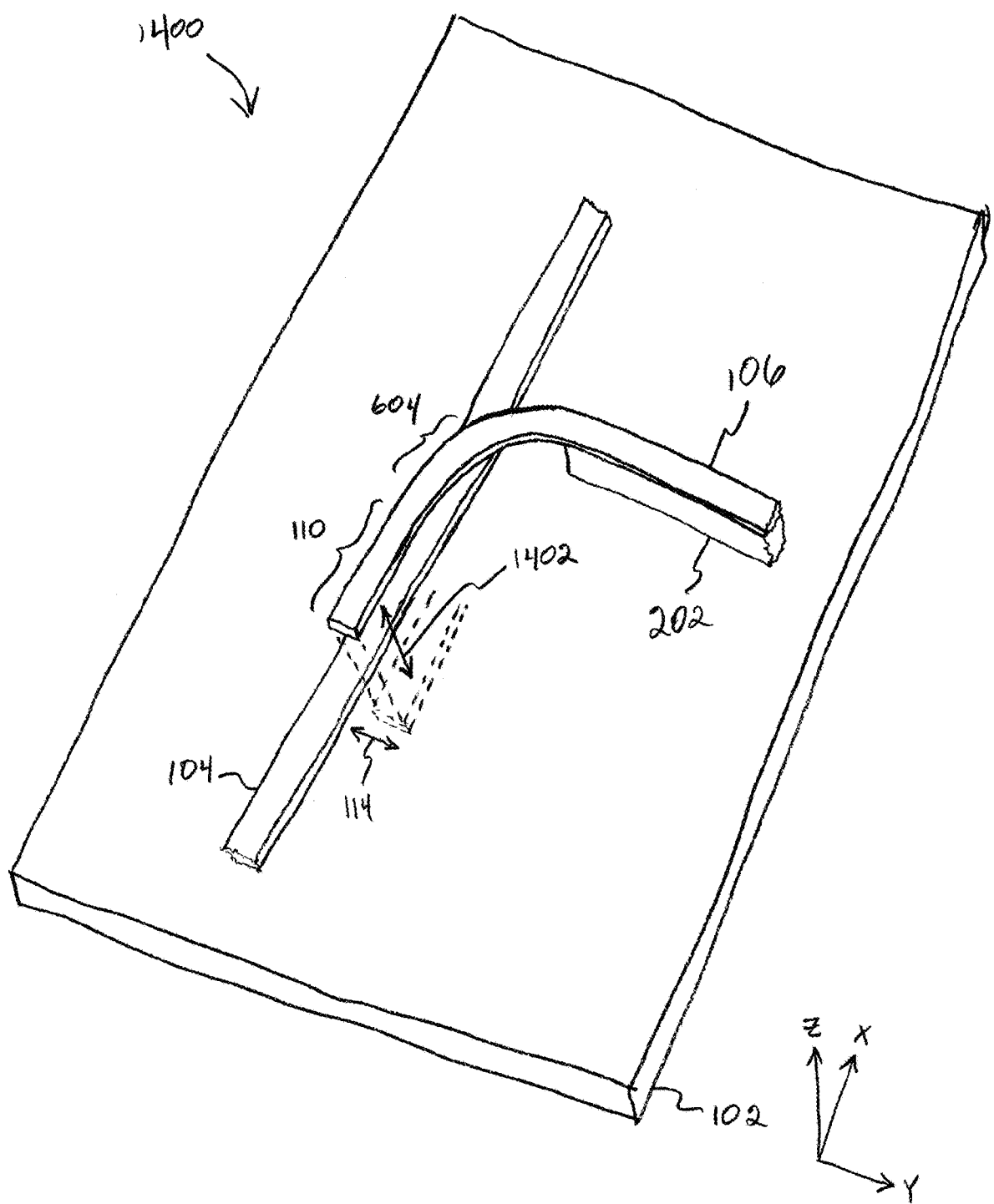
FIGS. 14 and 15 are respective perspective views of another embodiment of the optical switch of FIG. 1, in which an end of one waveguide is disposed laterally displaced from the medial portion of the other waveguide, according to an embodiment of the present invention.
Figure 15:
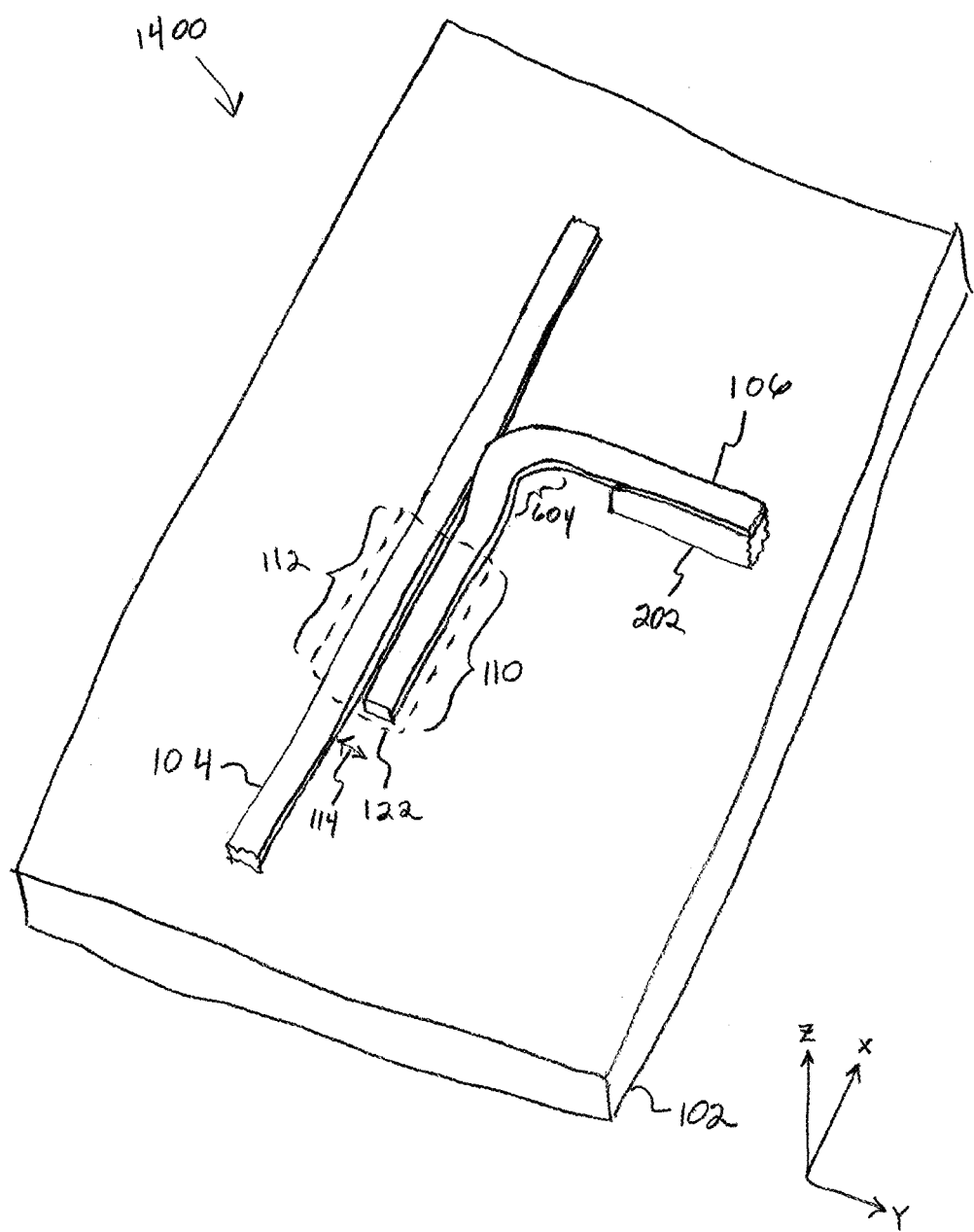

FIGS. 14 and 15 illustrate an optical switch 1400 that is similar to the optical switch 600 shown in FIGS. 6-13, except the end portion 110 of the waveguide 106 is not registered above the medial portion 112 of the other waveguide 104. Instead, according to this embodiment, in both the ON and OFF positions, the end portion 110 is laterally displaced a distance 114 from the other waveguide 104, as viewed from above (normal to the surface 108).

FIG. 14 shows the optical switch 1400 in the OFF state, and FIG. 15 shows the optical switch 1400 in the ON state. As in the optical switch 600 described with respect to FIGS. 6-13, in the optical switch 1400, the end portion 110 translates vertically, as indicated by a double-headed arrow 1402. However, the end portion 110 of the waveguide 106 remains vertically unregistered with the medial portion 112 of the other waveguide 104, regardless whether the end portion 110 is in the OFF or ON position. In this embodiment, in the ON state, the end portion 110 of the waveguide 106 and the medial portion 112 of the other waveguide 104 couple laterally, as indicated by the coupling region 122 in FIG. 15. Thus, in this embodiment, the end portion 110 is the aforementioned translatable optical component.

A MEMS structure (not shown in FIGS. 14 and 15 for clarity) similar to the MEMS structure 124 shown in FIGS. 10-13, although with the end portion 110 and medial portion 112 laterally displaced from each other, may be used to translate the end portion 110. Although the MEMS structure 124 described with respect to FIGS. 10-13 has flexures on both sides of the translatable optical component (coupler), in cases where the translatable optical component translates in a plane that does not intersect another waveguide (as in FIGS. 14 and 15), the MEMS structure 124 may have flexures on only one side, and the MEMS structure 124 may be anchored on only one side, as described below, with respect to FIGS. 35 and 36. The end portion 110 can be described as translating vertically next to the medial portion 112 of the other waveguide 104. Thus, in this embodiment, the dispositional aspect of the end portion 110 and the medial portion 112 may be described as next to, side by side or unregistered.

Referring to FIG. 1, if the waveguide 104 continues to another optical switch (not shown) or another optical component (not shown), the waveguide 104 may be referred to as a "bus" waveguide, and the other waveguide 106 may be referred to as a "pick-off" waveguide because, when the optical switch 100 is in the ON state, the other waveguide 106 "picks off" light from the bus waveguide. As described above, one aspect of the optical switch 100 is relative vertical positions of the medial portion 112 of the bus waveguide and the end portion 110 of the pick-off waveguide. FIGS. 2, 3 and 6-14 show optical switches 200, 600 and 1400, in which the end portion 110 of the pick-off waveguide 106 is disposed higher than the medial portion 112 of the bus waveguide 104, relative to the photonic chip 102, at least in the OFF state. On the other hand, FIGS. 4 and 5 show an optical switch 400 in which the end portion 110 of the pick-off waveguide 106 is disposed lower than the medial portion 112 of the bus waveguide 104.

Figure 16:
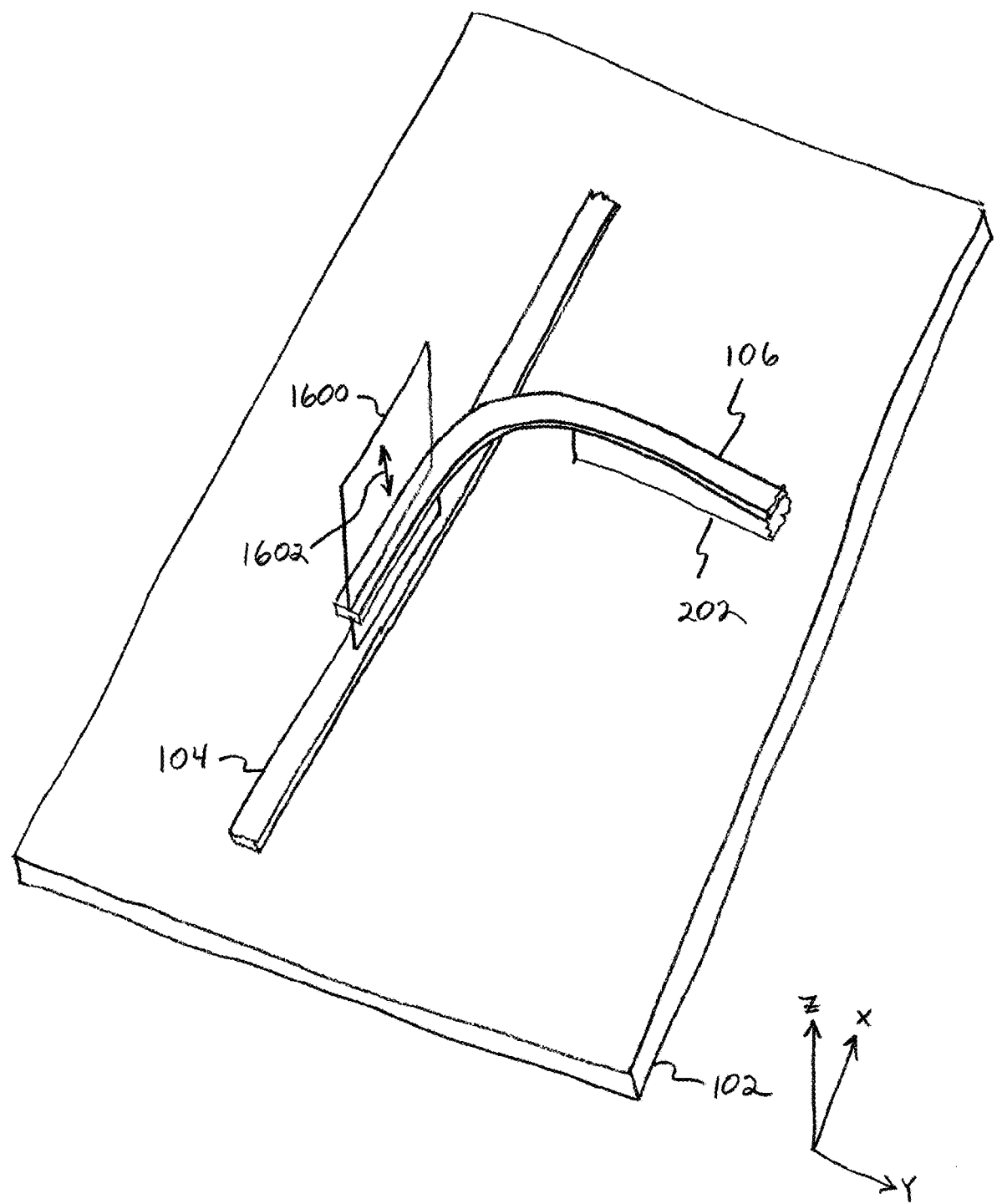
FIG. 16 is a perspective view of an optical switch according to any embodiment of the present invention in which a translatable optical component translates in a plane that intersects another waveguide.

Another aspect of the optical switch 100 is relative horizontal positions of the medial portion 112 of the bus waveguide and the end portion 110 of the pick-off waveguide. FIGS. 2-13 show optical switches 200, 400 and 600, in which the end portion 110 of the pick-off waveguide is registered vertically with the medial portion 112 of the bus waveguide. In these embodiments, the translatable optical component, be it the end portion 110 or the medial portion 112, translates in a plane 1600 that intersects the other waveguide, as shown in FIG. 16. The translatable optical component translates along an axis, as indicate by a double-headed arrow 1602. On the other hand, FIGS. 14 and 15 show an optical switch 1400, in which the end portion 110 of the pick-off waveguide is displaced laterally, and therefore not registered vertically, with the medial portion 112 of the bus waveguide. In this embodiment, the translatable optical component translates in a plane that does not intersect the other waveguide.

Translatable Optical Component

Figure 17:
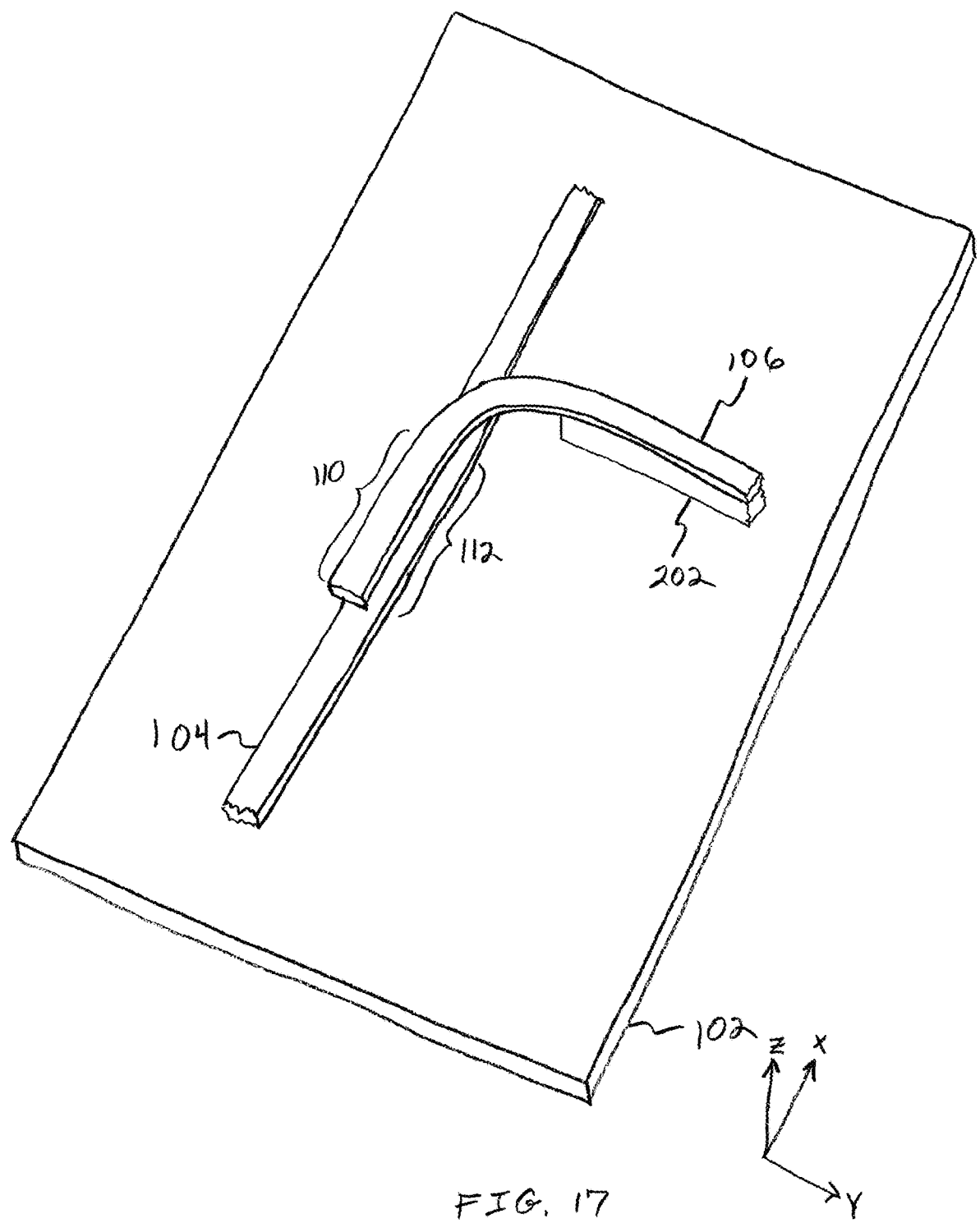
FIG. 17 is a perspective view of an optical switch that includes a resonant coupler, according to several embodiments of the present invention.

Another aspect of the optical switch 100 involves the nature of the translatable optical component, which may influence the type of coupling (adiabatic or resonant) that occurs when the optical switch is in the ON state. FIG. 17 is a perspective view of an optical switch in which the end portion 110 of one waveguide 106 and the medial portion 112 of the other waveguide 104 have about equal effective indexes at the design wavelength. In this case, when the end portion 110 and the medial portion 112 are in the ON position, the coupling between the end portion 110 and the medial portion 112 is resonant.

Several factors affect index, including material and dimensions. Thus, one way to make the effective indexes about equal is to make the end portion 110 and the medial portion 112 of the same material and make their respective dimensions about equal. However, if the end portion 110 and the medial portion 112 are made of different materials, their respective effective indexes may be made about equal by adjusting their respective dimensions, as is well known to those of skill in the art. Similarly, if the respective dimensions of the end portion 110 and the medial portion 112 are different, they may be made to have an about equal effective index by careful selection of their respective materials.

In a resonant coupler, optical power transfers between the two waveguides 104 and 106 due to symmetric and asymmetric modes having different propagation speeds. If length of the resonant coupler is properly selected, the input power can be arbitrarily divided among the output waveguides, as is known to those of skill in the art. Unless otherwise indicated, in embodiments described herein, resonant couplers are designed to transfer power as completely as practical, thus the optical switches can be considered ON/OFF switches. However, in other embodiments, the length of the resonant coupler is selected such that less than as much power as practical is transferred when the optical switch is in the ON state, and the remainder of the power continues through the other waveguide.

Thus, for resonant couplers, it is important to accurately control relative positions of coupling portions of the waveguides 104 and 106 when the optical switch is in the ON state, since resonant coupling is critically dependent on the separation between waveguides 104 and 106. This may be accomplished by constraining the motion of the MEMS structure to a nearly purely vertical motion, and by including physical stops, such as stop 1002 (FIG. 10), for the MEMS structure to rest on when in the ON position.

Figure 18:
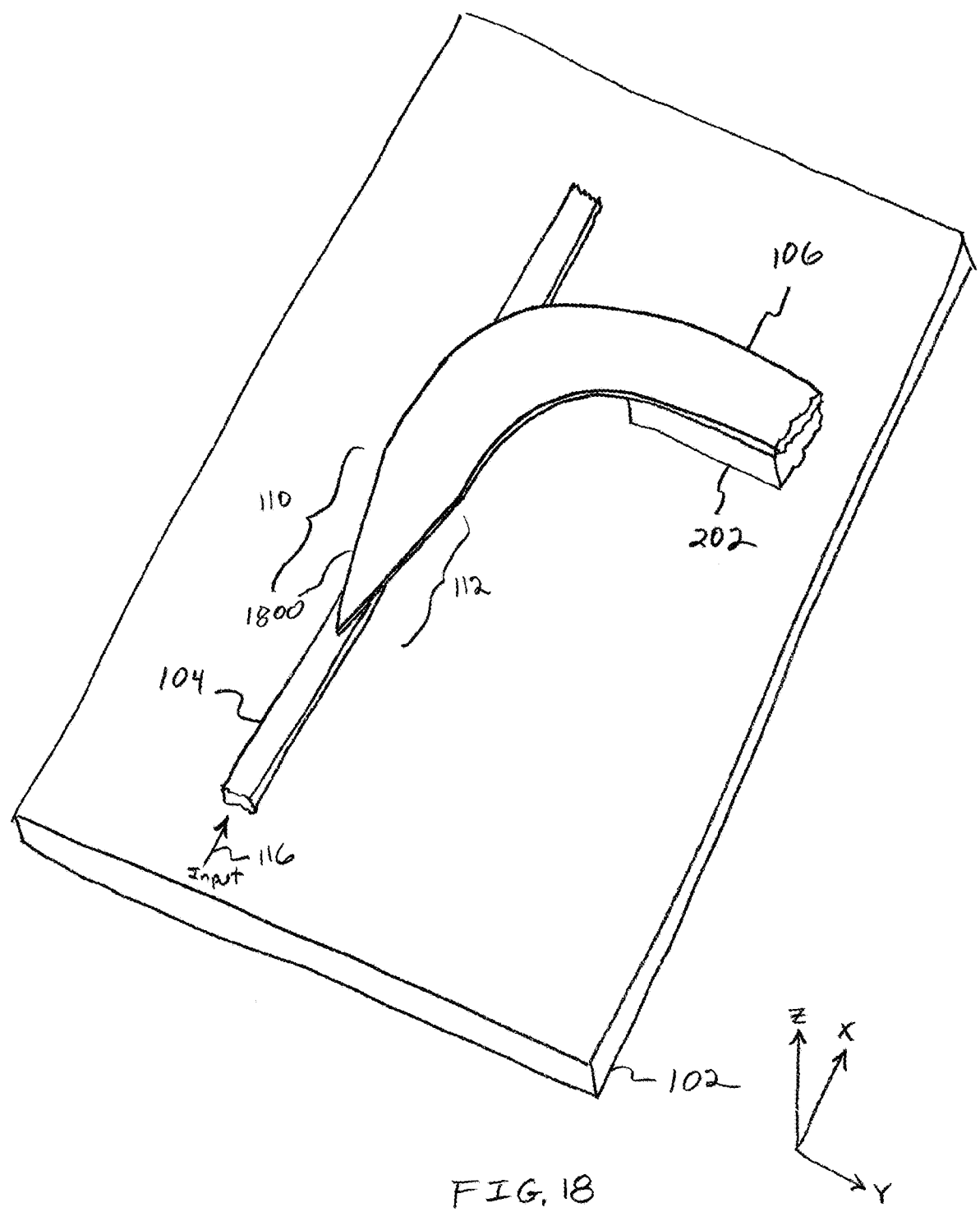
FIG. 18 is a perspective view of an optical switch that includes an adiabatic coupler, according to several embodiments of the present invention.

Matching the effective indexes of the end portion 110 and the medial portion 112 and constraining the motion of the MEMS structure are difficult to achieve. To avoid this difficulty, in some embodiments, as shown in FIG. 18, if the two waveguides 104 and 106 have different indexes, at least one of the end portion 110 or the medial portion 112 tapers to facilitate adiabatic coupling between the end portion 110 and the medial portion 112 when the optical switch is in the ON state. In the embodiment shown in FIG. 18, the end portion 110 of the waveguide 106 is tapered to form an adiabatic coupler 1800. Material and dimensions of the end portion 110 and the medial portion 112 should be chosen such that the effective index of the guided mode in the adiabatic coupler 1800 is initially less than the effective mode index of the other waveguide 104, and the effective mode index gradually increases to a value greater than the effective mode index of the other waveguide 104, in the direction in which the input light propagates. Power is transferred between the two waveguides 104 and 106 as their respective effective indexes cross.

Such a tapered coupler 1800 is relatively tolerant of slight misalignments or slight displacements of one or both of the waveguides 104 and 106, manufacturing non-idealities, variations in material from optical switch to optical switch, etc. On the other hand, fabrication tolerances must be kept tight for resonant couplers.

Any of the optical switches described herein may employ an adiabatic or a resonant coupler, as discussed with respect to FIGS. 17-18. Furthermore, resonant coupling may introduce wavelength selectivity, which may have potential benefits in background noise reduction or wavelength multiplexing/demultiplexing via a series of optical switches.

Optical Coupling "Frustrator"

Figure 19:
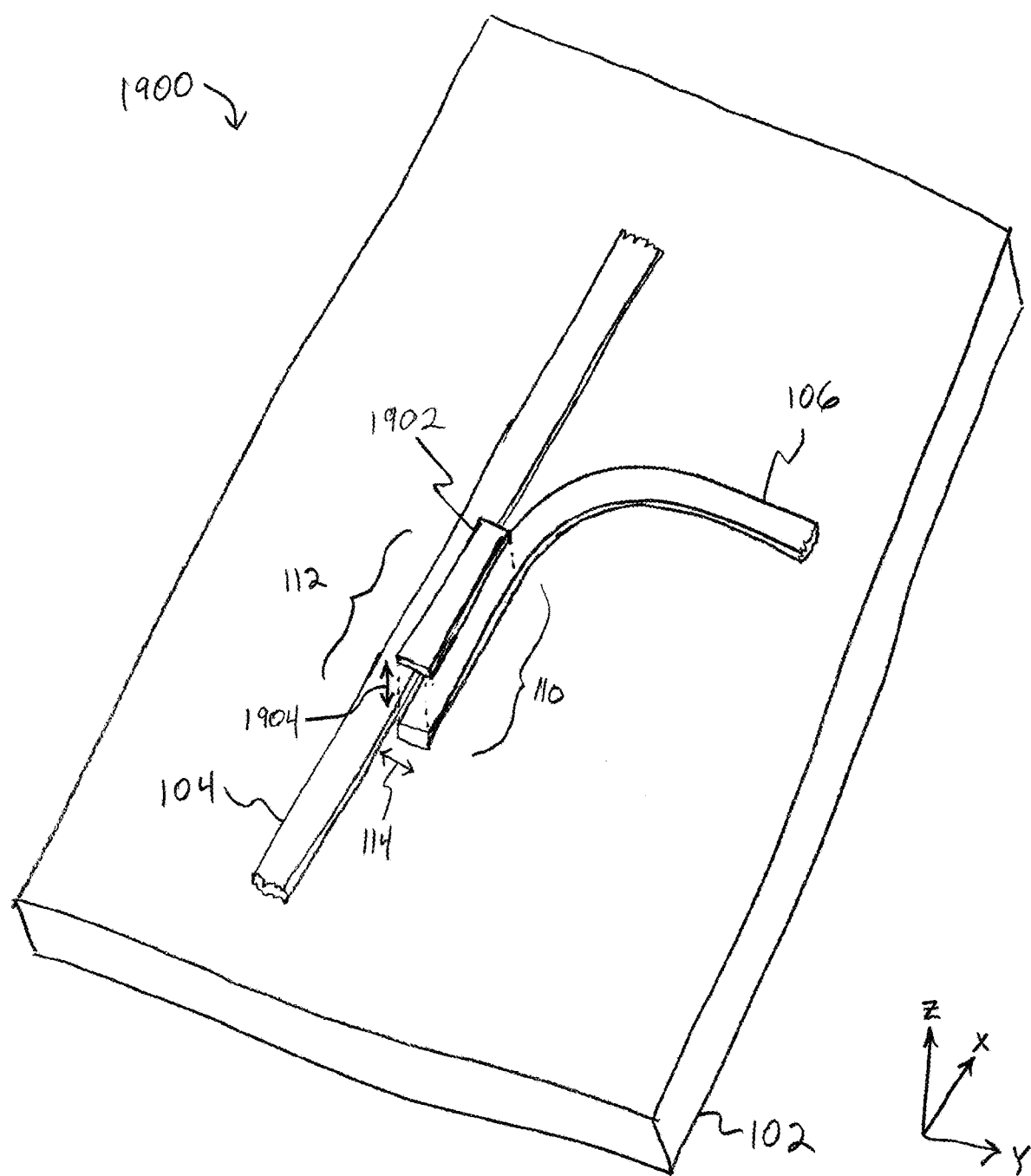
FIG. 19 is a perspective view of yet another embodiment of the optical switch of FIG. 1, in which a vertically-translatable coupling frustrator is used to control whether two optical waveguides couple, according to an embodiment of the present invention.

FIG. 19 is a perspective illustration of an optical switch 1900, according to another embodiment of the present invention. As with the optical switch 1400 shown in FIGS. 14 and 15, the two waveguides 104 and 106 are laterally displaced a distance 114 from each other. However, unlike the optical switch 1400, neither of the waveguides 104 or 106 (neither the end portion 110 of one waveguide 106, nor the medial portion 112 of the other waveguide) translates. Instead, the end portion 110 of the waveguide 106 and the medial portion 112 of the other waveguide 104 are fixed in place, relative to the photonic chip 102, such that the medial portion 112 is coupled to the end portion 110 with a coupling efficiency of at least 85%, at the design wavelength. By keeping both waveguides fixed in place, tighter tolerances on waveguide separation can be ensured. As noted, accurately controlling relative positions of coupling portions of the waveguides 104 and 106 when the optical switch is in the ON state is important for high-efficiency resonant coupling. In contrast, prior art optical switches by Seok and Han translate two couplers, which can create alignment and spacing problems.

In the optical switch 1900, the translatable optical component is a membrane 1902 (an "optical coupling frustrator") that is disposed above the end portion 110 of the waveguide 106. The membrane 1902 is mechanically coupled to the translatable portion of the MEMS structure 124 (not shown for clarity). Thus, the translatable portion of the MEMS structure 124 translates the membrane 1902 vertically, as indicated by a double-headed arrow 1904, in a manner similar to the way the translatable portion of the MEMS structure 124 translates the end portion 110 of the waveguide 106 in the optical switch 1400. The MEMS structure 124 is similar to the MEMS structure 124 described with respect to the optical switch 1400 shown in FIGS. 14 and 15.

Material and dimensions of the membrane 1902, as well as distance over which the membrane translates 1904, are selected such that when the membrane 1902 is in a first position distal from the end portion 110 (an "ON" position), interaction between the membrane 1902 and the end portion 110 of the waveguide 106 is minimal or negligible, and light couples from the first waveguide 104 into the second waveguide 106 with an efficiency of at least about 85%; however when the membrane 1902 is in a second position proximate the end portion 110 (an "OFF" position), the membrane 1902 interacts strongly with the end portion 110. This interaction frustrates the coupling between the two waveguides 104 and 106 by breaking the symmetry between the two waveguides 104 and 106. This break in symmetry prevents existence of the symmetric and asymmetric modes described above, and consequently no coupling occurs between the two waveguides 104 and 106. When the coupling frustrator 1902 is in the OFF position, the two waveguides 104 and 106 are no longer phase matched, so power cannot be coupled between the waveguides 104 and 106.

Figure 20:
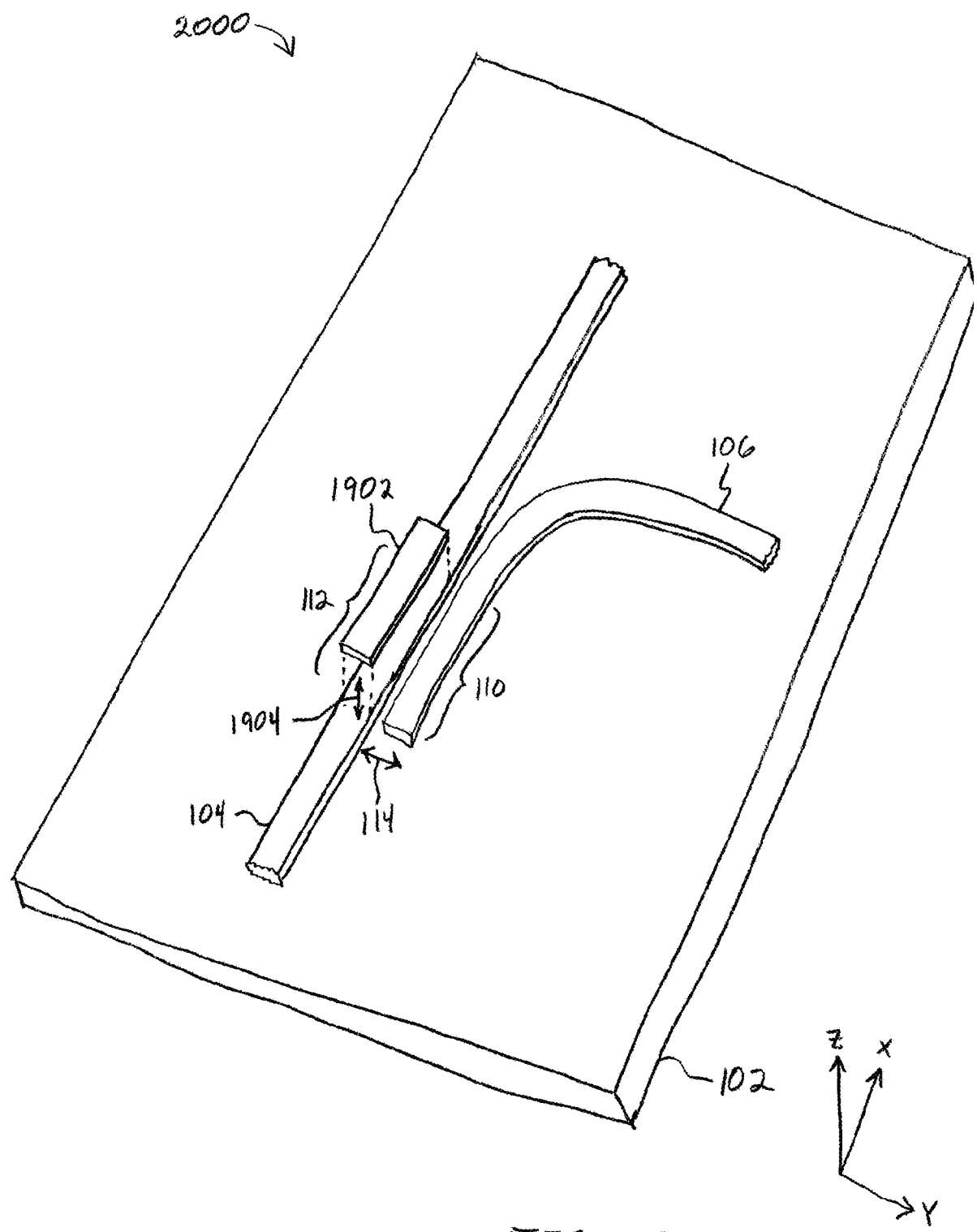
FIGS. 20, 21 and 22 are perspective views of alternative embodiments of the optical switch of FIG. 19, according to respective embodiments of the present invention.
Figure 21:
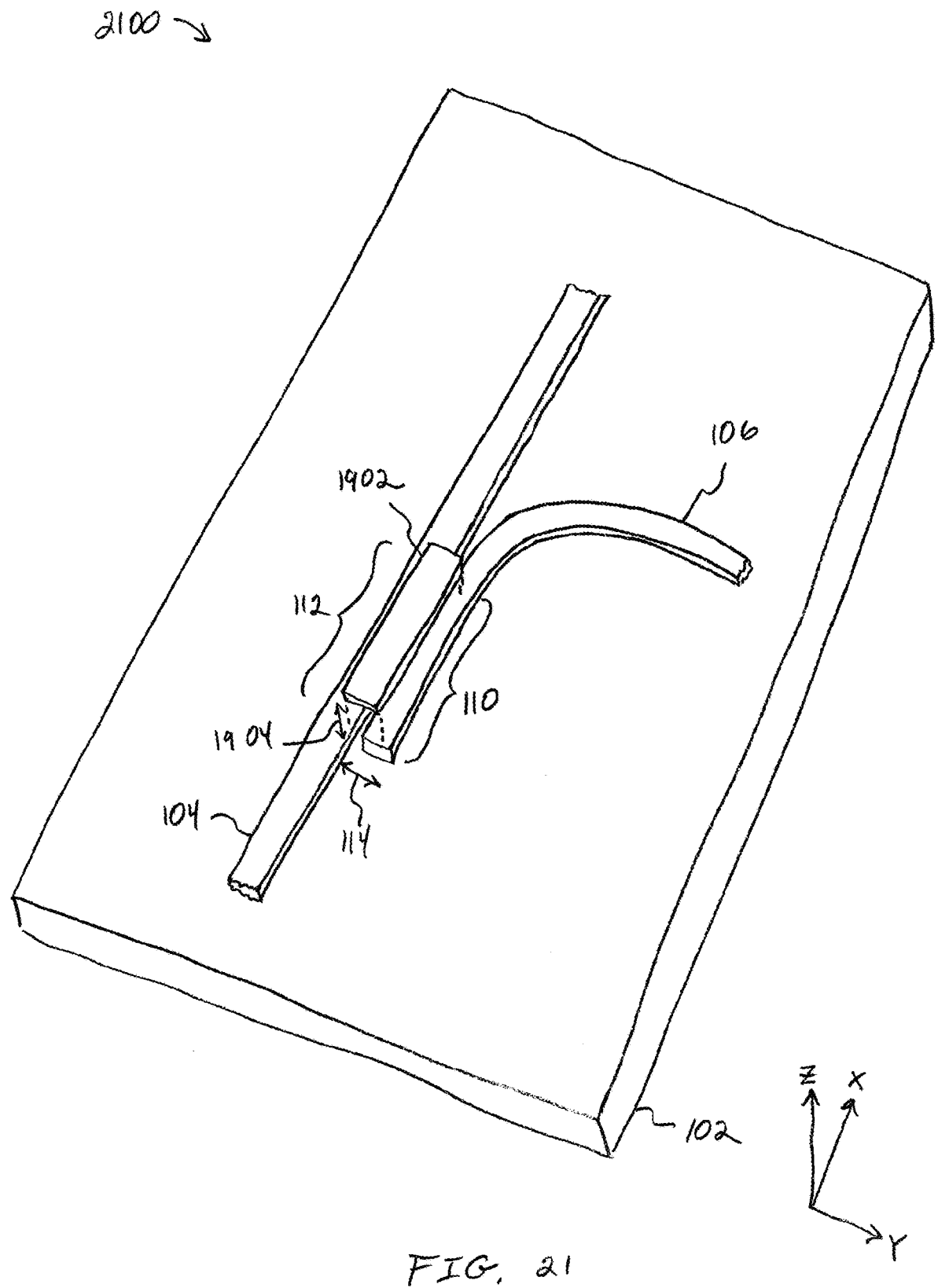

Although, in the embodiment shown in FIG. 19, the coupling frustrator 1902 is disposed above only the end portion 110 of the waveguides 106, in another embodiment shown in FIG. 20, in optical switch 2000, the coupling frustrator 1902 is disposed over the medial portion 112 of the other waveguide 104. In yet another embodiment shown in FIG. 21, in optical switch 2100, the coupling frustrator 1902 is disposed to a degree over both the end portion 110 of one waveguides 106 and the medial portion 112 of the other waveguide 104.

Disposing the coupling frustrator 1902 above only the end portion 110 of the waveguide 106, as in the optical switch 1900 (FIG. 19) has advantages. For example, light does not couple very strongly into the coupling frustrator 1902, and the coupling frustrator 1902 may be made of an optically lossy material. If the coupling frustrator 1902 is disposed above the waveguide 104, the coupling frustrator 1902 should be made thin enough not to have its own guiding mode, and the coupling frustrator 1902 should have low optical loss.

Figure 22:
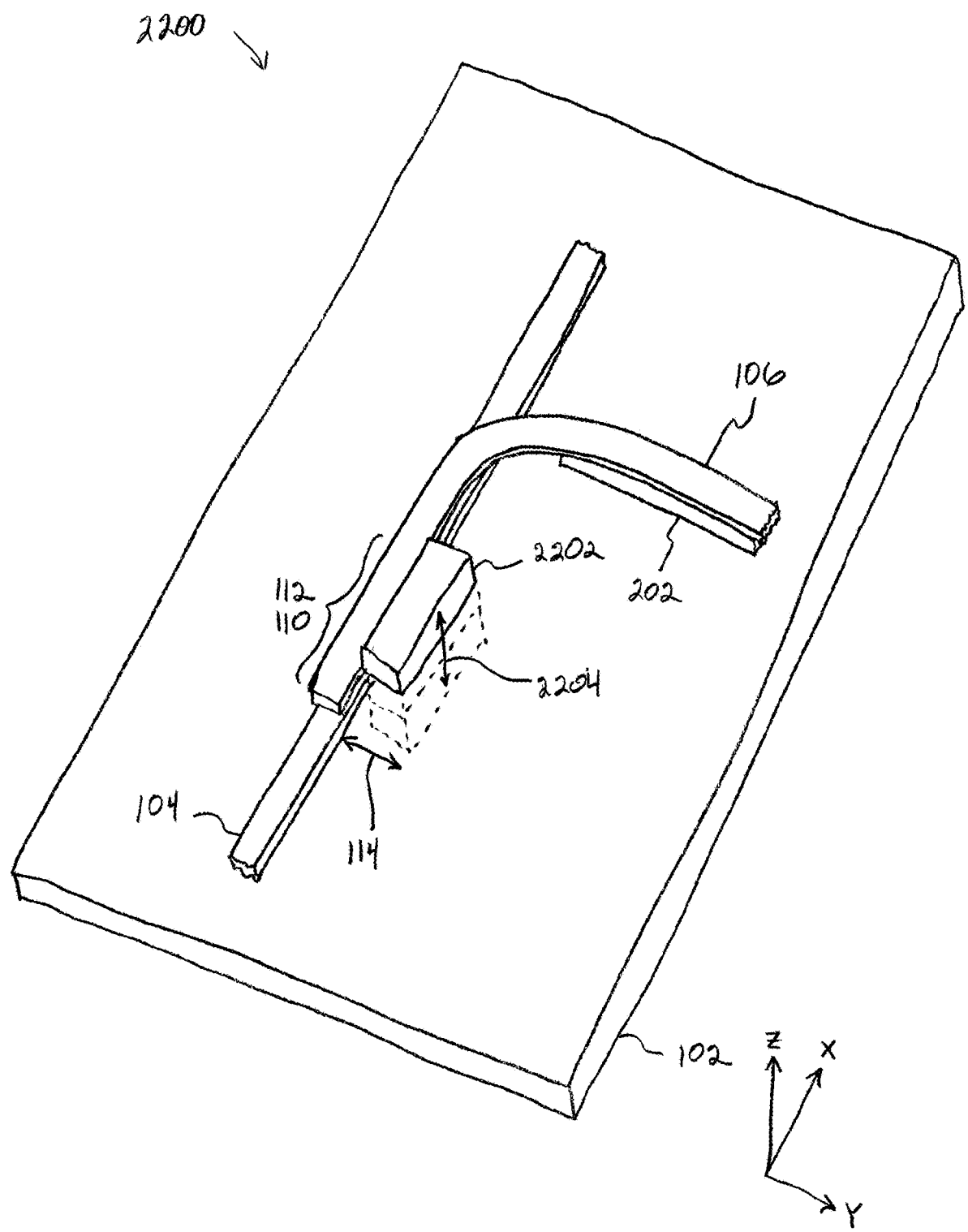

In another embodiment, shown in FIG. 22, in optical switch 2200, the end portion 110 of one waveguide 106 is registered above the medial portion 112 of the other waveguide 104. As in the optical switches 1900, 2000 and 2100, the end portion 110 and the medial portion 112 are disposed close enough together to couple, absent a coupling frustrator 2202. However, unlike the optical switches 1900-2100, in the optical switch 2200, the optical frustrator 2202 translates vertically 2204 along the side of the two waveguides 104 and 106. That is, the optical frustrator 2202 is displaced laterally a distance 114 from the two waveguides 104 and 106, and the optical frustrator 2202 translates in a plane (not shown) that does not intersect the two waveguides 104 and 106.

Figure 23:
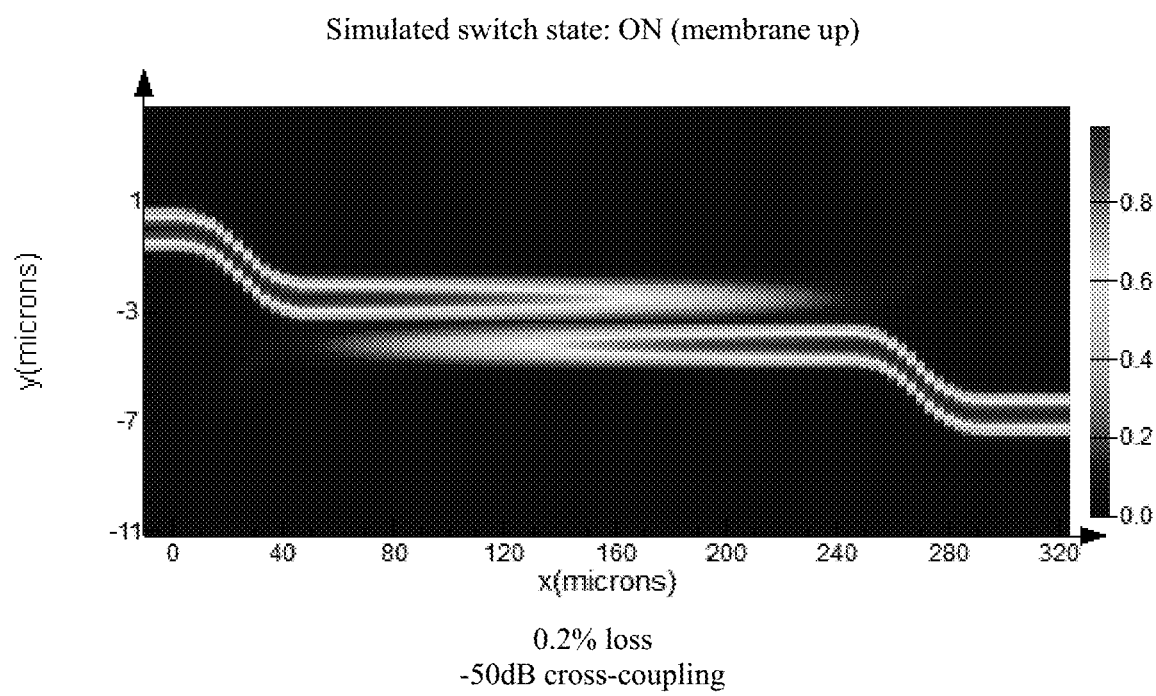
FIGS. 23 and 24 show results of a computer simulation of the optical switch of FIG. 19 in the ON and OFF states, respectively.
Figure 24:
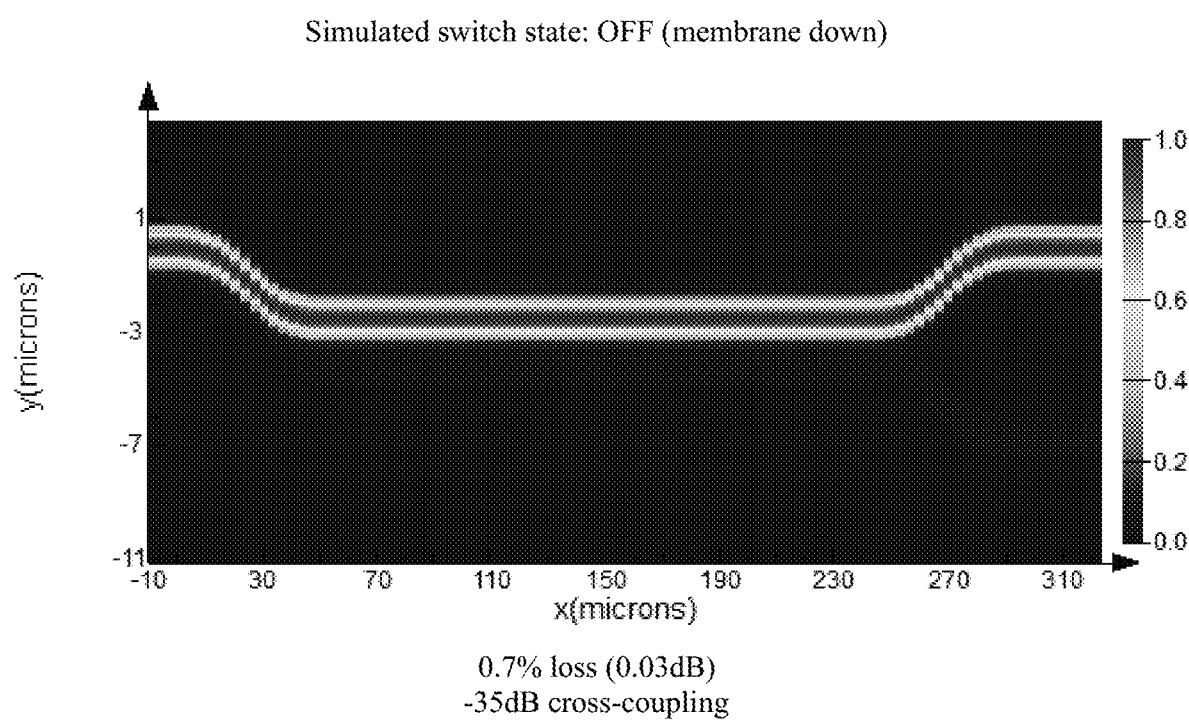

In optical switch embodiments 1900-2200 that translate an optical frustrator 1902 or 2202, light need not necessarily pass through the volume defined by the MEMS structure 124. Thus, the light does not enter the material of the MEMS structure 124, except for possible evanescent interactions. Therefore, materials that exhibit some optical loss may be used for the MEMS structure 124, which is significant, in that wavelengths near 900 nm are of particular interest in some applications. These wavelengths are absorbed by silicon, with absorption lengths similar to those modeled in FIGS. 23 and 24 (discussed below). Other MEMS devices may not be compatible with these optical losses in their respective waveguides. However, as shown in FIGS. 23 and 24, these optical losses can be tolerated in the MEMS optical frustrator 1902 or 2202, enabling silicon to be used as a material for the MEMS structure 124. This is important, because silicon is a favored material for MEMS devices, due to its physical and electrical properties, and its ease of fabrication.

In yet other embodiments (not shown) of an optical switch, in which the two waveguides 104 and 106 are either disposed one above the other, as in FIG. 22, or side by side, as in FIG. 19, the coupling frustrator may translate laterally, rather than vertically, as long as in the OFF state, the coupling frustrator is close enough to one of the waveguides to shift the effective index of the propagating mode of the waveguide, relative to the other waveguide.

Combined Aspects of Optical Switches

As noted, optical switches described herein involve various aspects, including: (a) whether an end portion of one waveguide is next to or above a medial portion of another waveguide, (b) whether the end portion is above or below the medial portion, (c) whether in the ON state the two waveguides are resonantly coupled or adiabatically coupled, (d) the number of possible switch states, (e) which optical component translates to change switch state and (f) the nature of the translatable optical component. These aspects may be combined in various ways. For example, the optical switch 200 described with reference to FIGS. 2-4 may include a resonant coupler or an adiabatic coupler. Similarly, the optical switch 400 described with reference to FIGS. 4-5 may include a resonant coupler or an adiabatic coupler.

Outer Boundary of the Optical Switch

The optical switch 100 has an outer boundary 136 (FIG. 1) that defines a smallest-sized rectangular area that includes the translatable optical component and the MEMS structure 124. The outer boundary 136 is the smallest rectangular area on the photonic chip 102 that includes the MEMS structure 124 and the translatable optical component, be that the medial portion 112 of the first optical waveguide 104 or the end portion 110 of the second optical waveguide 106. As can be seen in FIG. 1, the input/output ports 130-134 are all disposed outside the outer boundary 136. Each end (not shown) of the first optical waveguide 104 is disposed outside the outer boundary 136. The medial portion 112 of the first optical waveguide 104 is disposed within the outer boundary 136. The first end portion 110 of the second optical waveguide 106 is disposed within the outer boundary 136. A second end (not shown) of the second optical waveguide 106, opposite the first end portion 110, is disposed outside the outer boundary 136. The MEMS structure 124 is disposed within the outer boundary 136.

Computer Simulations

FIGS. 23 and 24 show results of computer simulations of the optical switch 1900 (FIG. 19) performed with a Bidirectional Eigenmode expansion and varFDTD engine of Mode Solutions software from Lumerical, Inc. The simulations include extra bends in the waveguides, beyond those shown in FIG. 19, to separate the input and output waveguides. Table 1 lists example device parameters used in the simulations. FIG. 23 shows results of a simulation of the optical switch 1900 in the ON state, i.e., with the coupling frustrator 1902 distal from the end portion 110 of the waveguide. FIG. 24 shows results of a simulation of the optical switch 1900 in the OFF state, i.e., with the coupling frustrator 1902 proximate the end portion 110. The simulated membrane material was chosen to have significant optical loss (absorption length of about 100 microns), yet the performance of the optical switch 1900 was still excellent. As can be seen from FIGS. 23 and 24 the optical switch 1900 exhibits low optical loss and excellent extinction in both states.

TABLE 1

Example device parameters for optical switch simulations

| Parameter | Value |
| --- | --- |
| Waveguide Index | High index silicon nitride (~2.15) |
| Wavelength | 1550 nm |
| Waveguide thickness | 300 nm |
| Waveguide width | 1300 nm |
| Waveguide Gap | 400 nm |
| Coupling length | 194 um |
| Membrane thickness | 300 nm |
| Membrane gap above waveguide (off) | 1000 nm |
| Membrane gap above waveguide (on) | 150 nm |
| Membrane index | n = 3.63 (real), k = 0.00248 (loss) |

Figure 25:
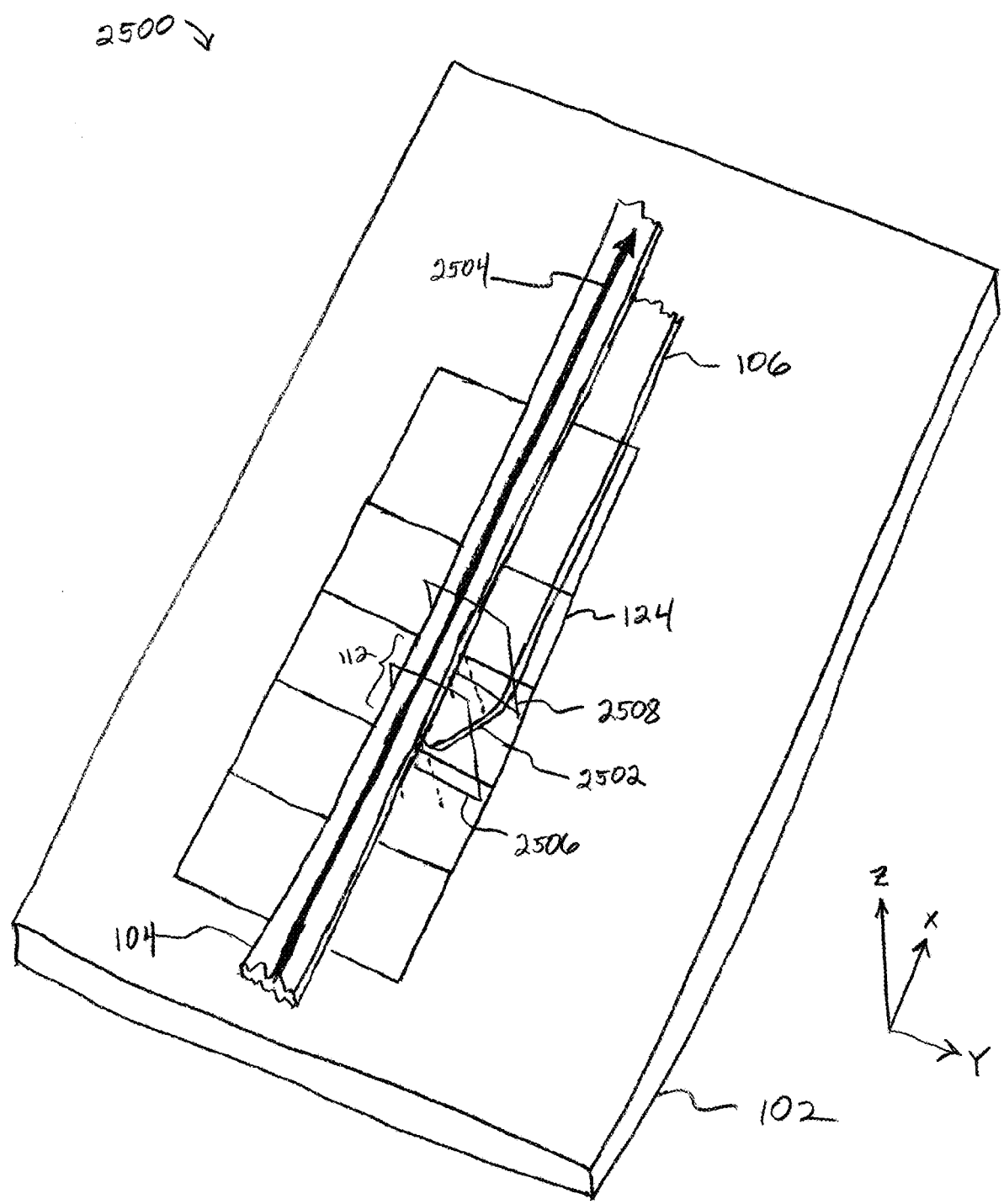
FIGS. 25 and 26 are perspective views of yet another embodiment of the optical switch of FIG. 1, in which an adiabatic coupler is disposed below a medial portion of the other waveguide, according to an embodiment of the present invention.
Figure 26:
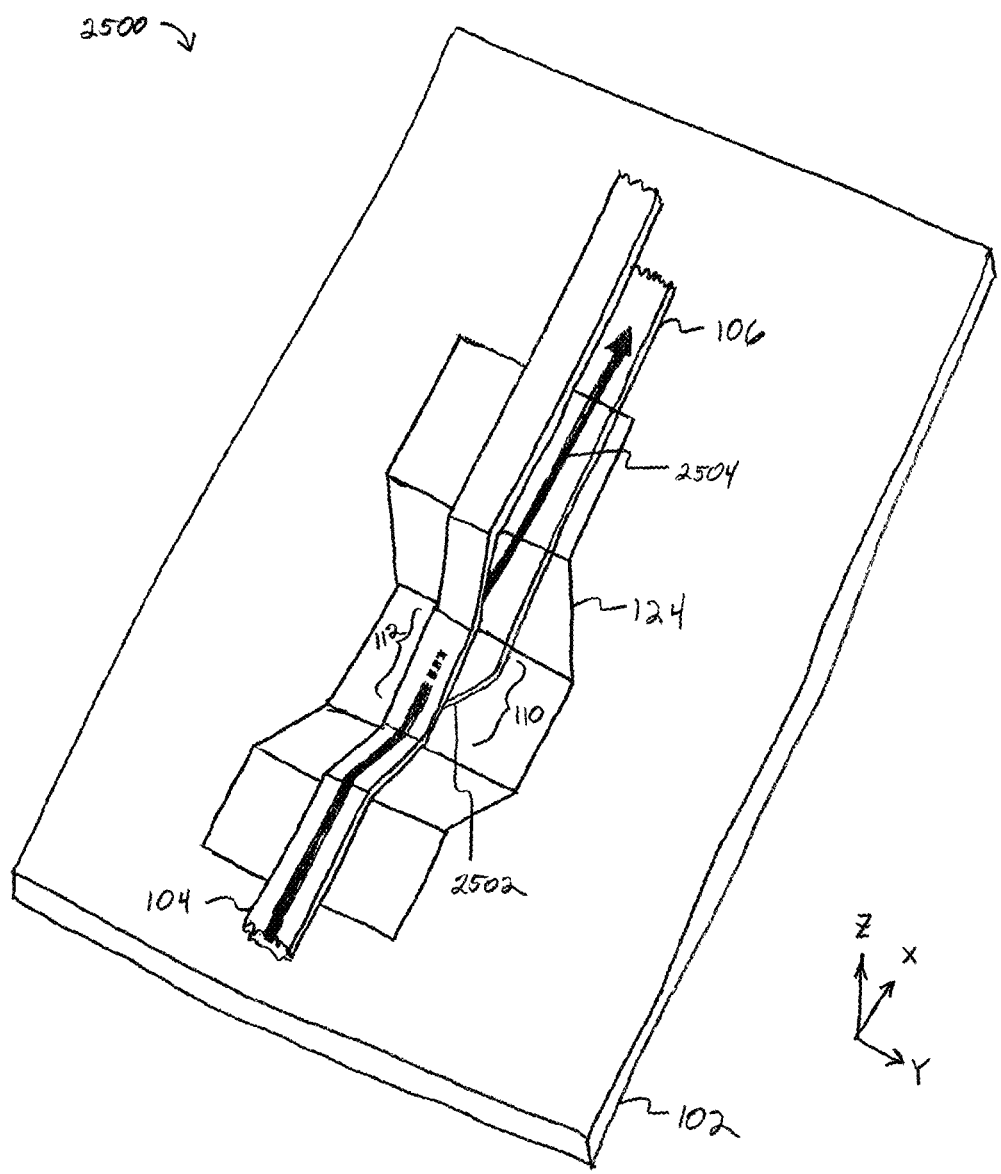

FIGS. 25 and 26 are perspective illustrations of an optical switch 2500 that includes an adiabatic coupler 2502 disposed below the medial portion 112 of the other waveguide 104. An adiabatic coupler was described with respect to FIG. 18. Other aspects of the optical switch 2500 are similar to other embodiments described herein, such as with respect to FIGS. 4, 5, 10, 11 and 18. FIGS. 25 and 26 illustrate the translatable portion of the MEMS structure 124 as a wire frame. FIG. 25 illustrates the MEMS structure 124 when the optical switch 2500 is in the OFF state, i.e., the medial portion 112 is distal from the adiabatic coupler 2502, and FIG. 26 illustrates the MEMS structure 124 when the optical switch 2500 is in the ON state, i.e., the medial portion 112 is proximate the adiabatic coupler 2502. An arrow 2504 indicates a path of light propagating through the optical switch 2500, from the waveguide 104 to the waveguide 106.

FIGS. 27, 28, 29 and 30 show computer simulation results for the optical switch 2500. Table 2 lists example device parameters used in the simulations.

TABLE 2

Example device parameters for optical switch simulations

| Parameter | Value |
| --- | --- |
| Wavelength | 1550 nm |
| Waveguide materials | Silicon nitride |
| Top bus waveguide dimensions | 1300 nm wide × 300 nm thick |
| Bottom adiabatic taper cross section | 100 nm wide × 300 nm thick to 2000 nm wide × 300 nm thick |
| Adiabatic coupler length | 30 μm |
| Separation between bus and adiabatic coupler | 100 nm when ON 1000 nm when OFF |
| Total device length | 60 μm |
| Transmission on bus waveguide when OFF | >99% |
| Coupling to lower waveguide layer when ON | >95% |
| Mechanical support membrane (top waveguide) | Silicon nitride |
| Mechanical support membrane thickness | 100 nm |

Figure 27:
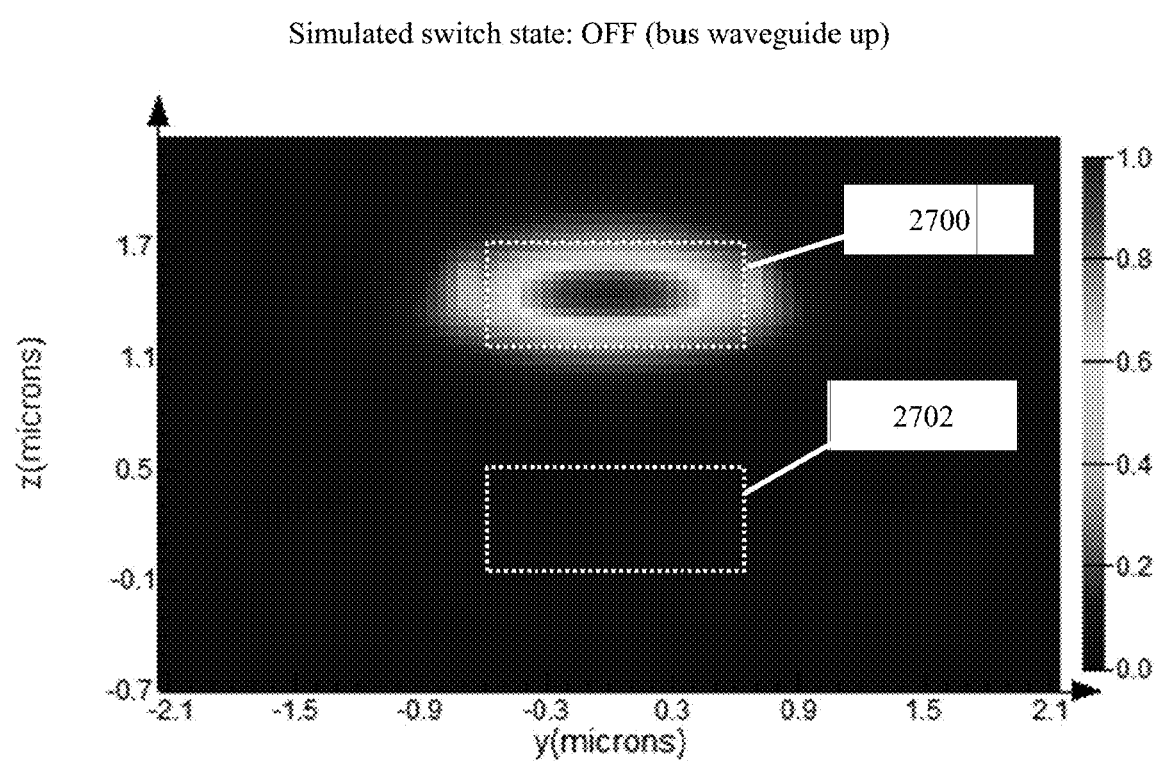
FIGS. 27, 28, 29 and 30 show results of computer simulations of the optical switch of FIGS. 25 and 26.
Figure 28:
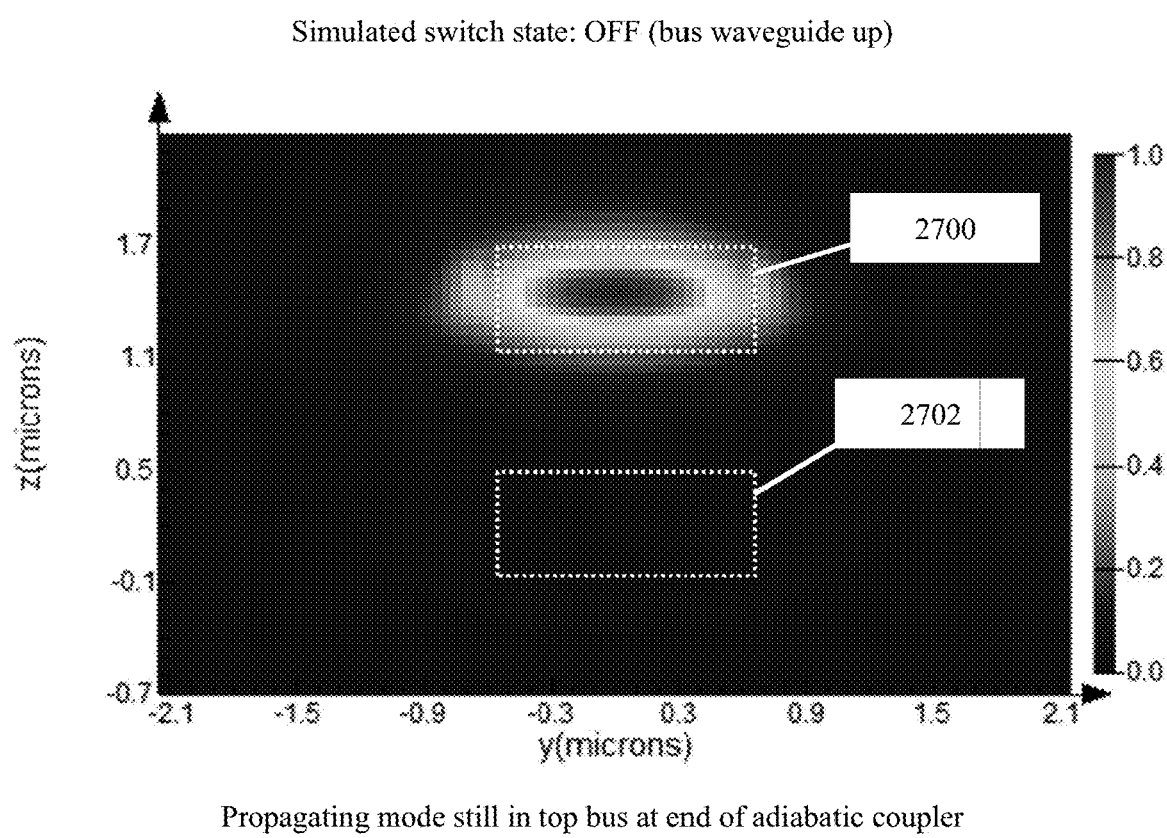
Figure 29:
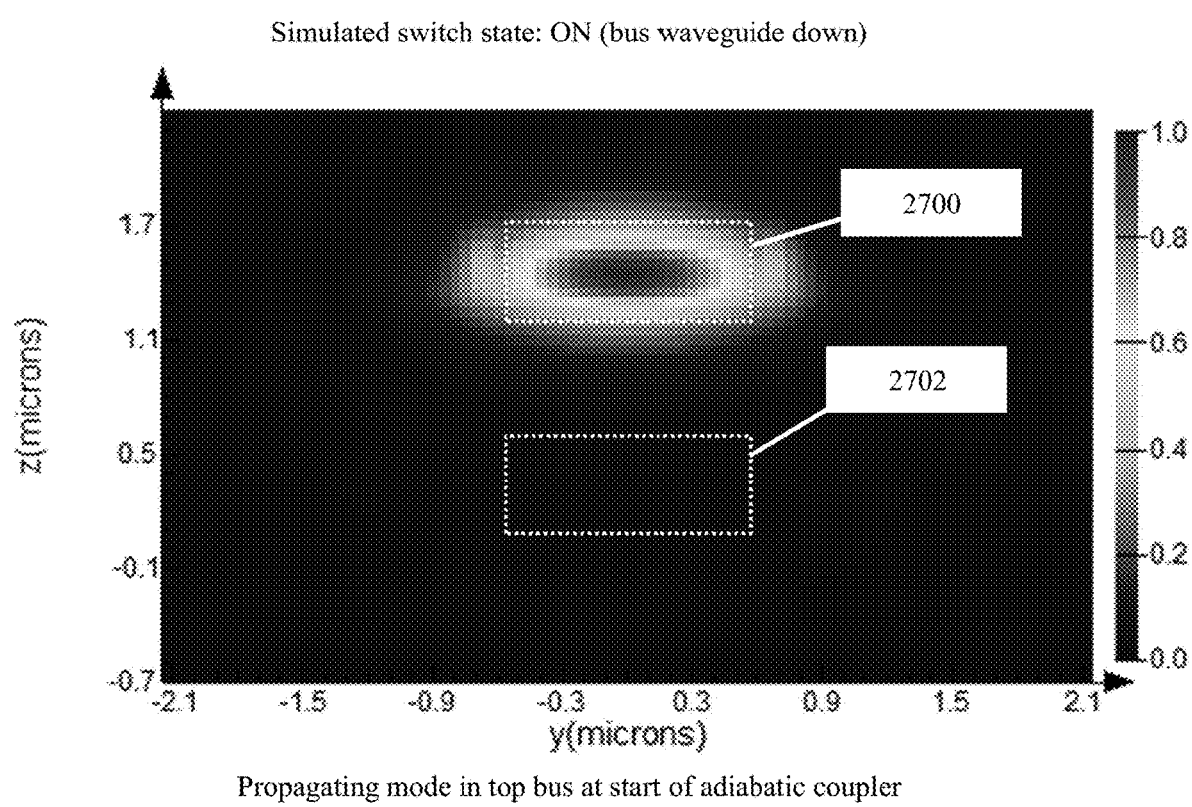
Figure 30:
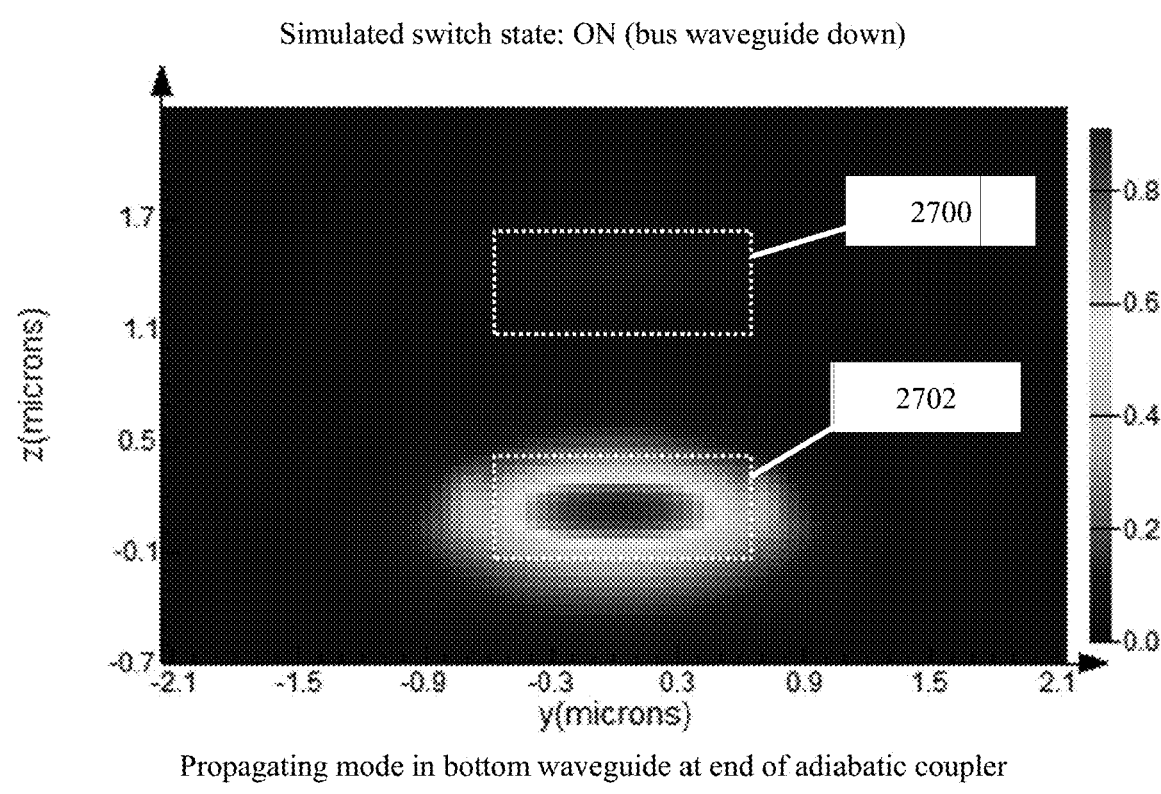

FIGS. 27 and 29 depict graphs of optical power (mode profiles) at various x-y coordinates in cross-sections of the optical switch 2500 as viewed from section plane 2506, i.e., at the beginning of the adiabatic coupler 2502 (in the direction of light propagation) when the optical switch 2500 is in the OFF and ON states, respectively. FIGS. 28 and 30 depict graphs of the optical power (mode profiles) at various x-y coordinates in cross-sections of the optical switch 2500 as viewed from section plane 2508, i.e., at the end of the adiabatic coupler 2502 (in the direction of light propagation) when the optical switch 2500 is in the OFF and ON states, respectively.

In FIGS. 27-30, position 2700 represents the bus waveguide 104, and position 2702 represents the other waveguide 106. When the optical switch 2500 is in the OFF state, the propagating mode remains confined to the upper bus waveguide 104 (position 2700), as can be seen in FIGS. 27 and 28, i.e., no light couples into the adiabatic coupler 2502. However, when the optical switch 2500 is in the ON state, the propagating mode can be seen in the bus waveguide 104 at the x position corresponding to the beginning of the adiabatic coupler 2502 (FIG. 29), but by the x position corresponding to the end of the adiabatic coupler 2502, the propagating mode has been coupled from the bus waveguide 104 to the bottom waveguide 106, with most of the power confined in the bottom waveguide 106 (FIG. 30).

Dimensions for one implementation of the optical switch 2500 using silicon nitride for the waveguides 104 and 106 are provided in Table 2. Total length of the optical switch 2500 and waveguide dimensions can be adjusted, depending on desired total size of the optical switch 2500 and required performance. Other materials, for example silicon, sapphire, titanium dioxide, diamond, silicon carbide and chalcogenide glasses, can be used for the waveguides, depending on the desired wavelength of operation and optical powers to be handled by the optical switch 2500.

Additional/Alternative Structures and/or Materials

Figure 31:
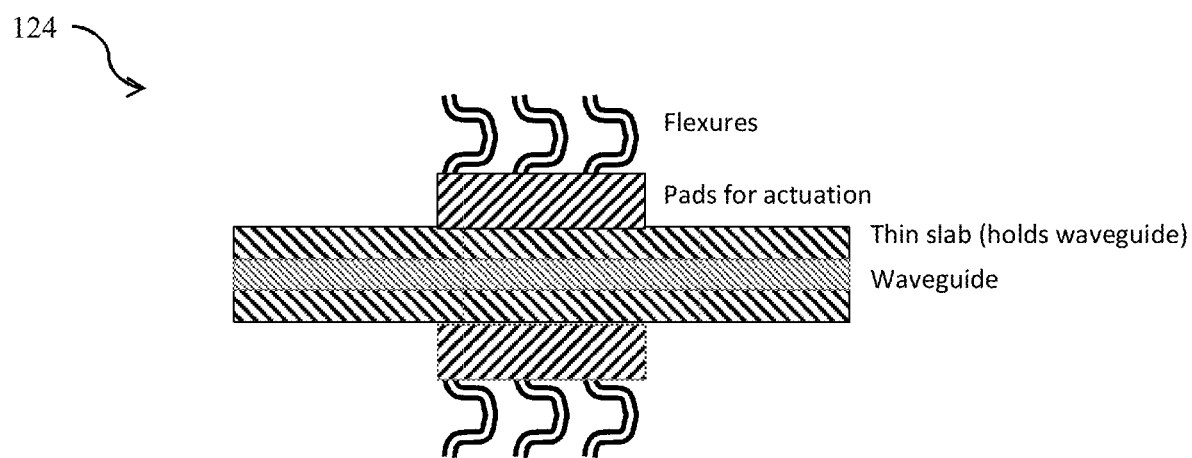
FIG. 31 is a top view.
Figure 32:
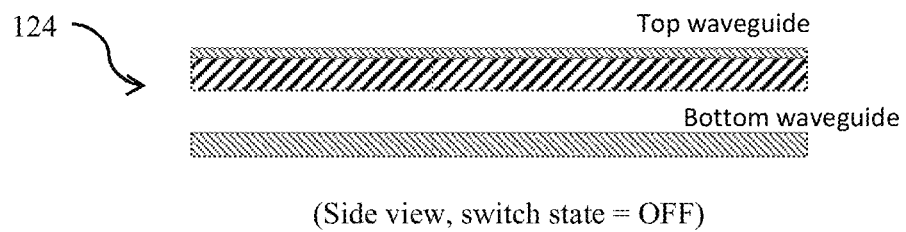
FIG. 32 is a side view (optical switch in the OFF state)
Figure 33:
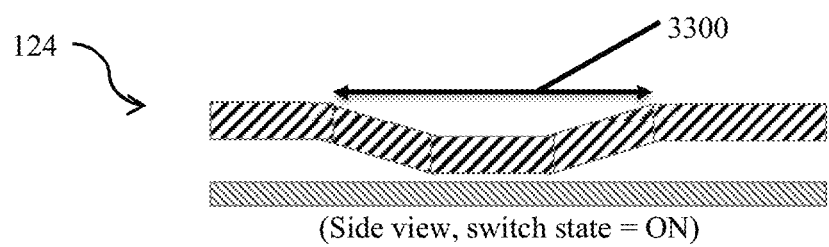
FIG. 33 is a side view (optical switch in the ON state)
Figure 34:
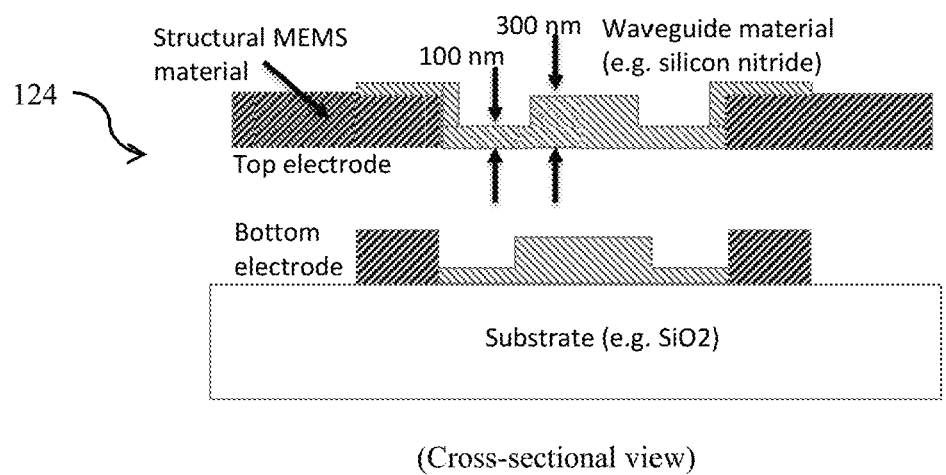
FIG. 34 is a cross-sectional view of a portion of a MEMS structure for translating a waveguide or a coupling frustrator, according to an embodiment of the present invention. The MEMS structure may be used in any optical switch described herein.

FIG. 31 is a top view, FIG. 32 is a side view (optical switch in the OFF state), FIG. 33 is a side view (optical switch in the ON state), and FIG. 34 is a cross-sectional view of a portion of a MEMS structure 124 for translating a waveguide or a coupling frustrator, according to an embodiment of the present invention. Thickness dimensions (about 100 and about 300 nm, respectively) in FIG. 34 are examples of dimensions that work well for an embodiment that includes silicon-rich silicon nitride material and operates at about 1550 nm wavelength. However, in other embodiments, thicknesses, waveguide materials and wavelengths may vary, depending on design choices. Distance 3300 (FIG. 33) is about 100 μm or longer, in some embodiments, to accommodate tension in the actuated regions. This MEMS structure 124 is primarily applicable to optical switches in which the two waveguides 104 and 106 are disposed one above the other. Ideally, the waveguide material, which is likely an electrical insulator, is deposited on top of the MEMS structural material, as well as on top of an electrode. Alternatively, the MEMS structural material may be deposited on top of the waveguide material. However, this results in an electrical insulator between the top and bottom electrodes.

Figure 35:
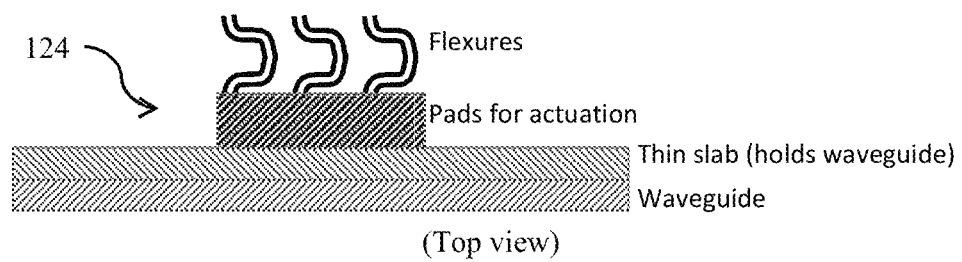
FIG. 35 is a top view.
Figure 36:
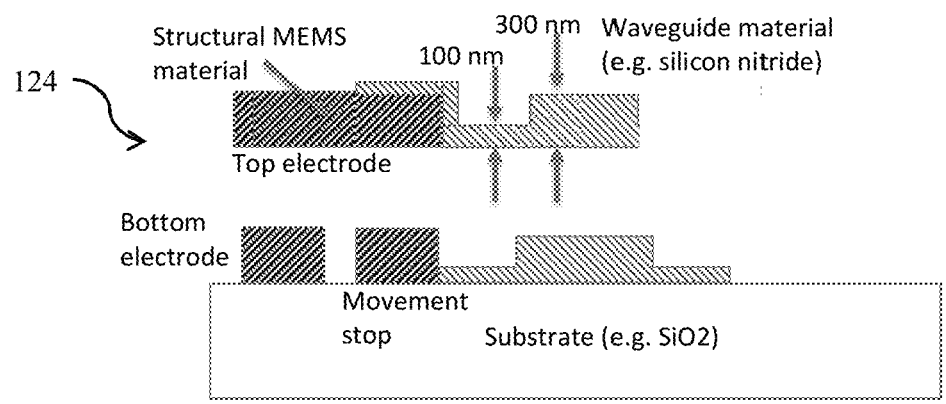
FIG. 36 is a cross-sectional view, of a portion of a MEMS structure for translating a waveguide or a coupling frustrator, according to another embodiment of the present invention. The MEMS structure may be used in any optical switch described herein.

FIG. 35 is a top view, and FIG. 36 is a cross-sectional view of a portion of a MEMS structure 124 for translating a waveguide or a coupling frustrator, according to another embodiment of the present invention. The thin slab between the waveguide and the pads for actuation shown in FIG. 35 is optional. Although FIG. 36 shows the upper waveguide directly above the lower waveguide, the lower waveguide need not be directly below the upper waveguide. Thickness dimensions (about 100 and about 300 nm, respectively) in FIG. 34 are examples of dimensions that work well for an embodiment that includes silicon-rich silicon nitride material and operates at about 1550 nm wavelength. However, in other embodiments, thicknesses, waveguide materials and wavelengths may vary, depending on design choices. Side views of the switch OFF and ON states are similar to FIGS. 32 and 33. This MEMS structure 124 is primarily applicable to optical switches in which the translating upper layer can be anchored on only one side, such as in embodiments in which a portion of a waveguide or a coupling frustrator translates vertically along the side of one or more other waveguides, such as shown in FIGS. 14, 15 and 22.

With actuation occurring on only one side, as in FIGS. 35-36, a stop may be used to prevent contact of the upper and lower waveguides. Otherwise, a single electrode pair, as opposed to one electrode pair on each side of the waveguide, will likely result in a slanted upper waveguide, at least when the MEMS structure is actuated. A stop levels the actuated portion of the MEMS structure.

Figure 37:
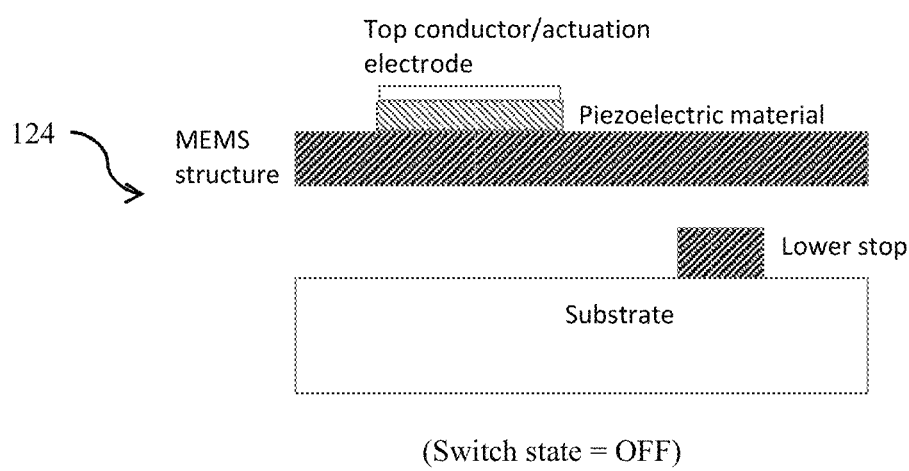
FIGS. 37 and 38 are side views of a MEMS structure in respective OFF and ON positions, according to another embodiment of the present invention. The MEMS structure may be used in any optical switch described herein.
Figure 38:
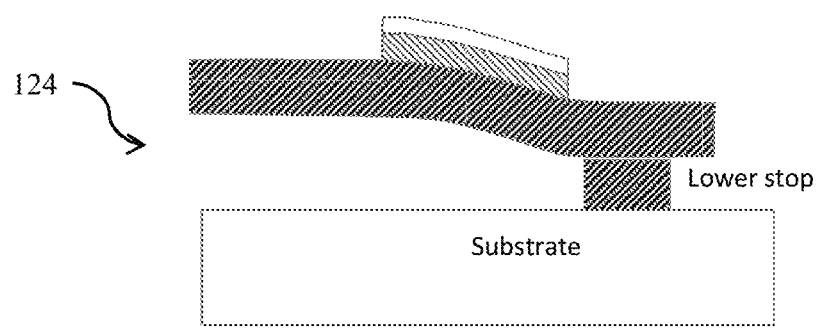

FIGS. 37 and 38 are side views of a MEMS structure 124 in respective OFF and ON states, according to another embodiment of the present invention. In this embodiment, a piezoelectric material is used for actuation, rather than a pair of electrodes that electrostatically attract or repel each other. This piezoelectric material expands or contracts, in response to an actuation voltage applied to the top conductor. This expansion or contraction results in the MEMS structure bending, as shown in FIG. 38. The lower stop limits translation of the MEMS structure and, therefore, levels the MEMS structure to the right.

Figure 39:
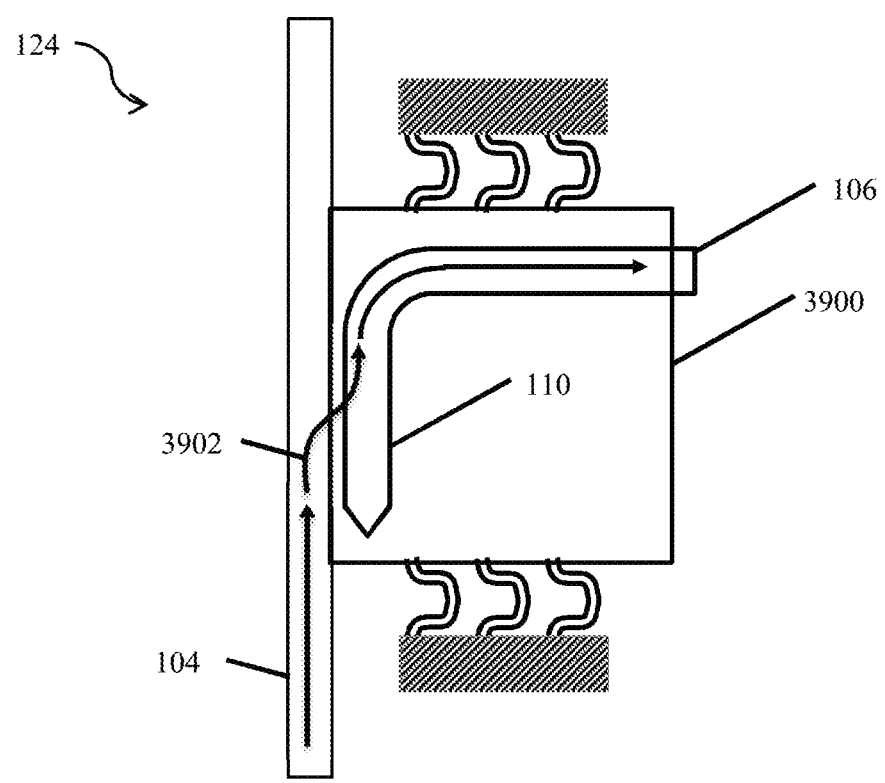
FIG. 39 is a top view of a MEMS structure in an ON position, according to another embodiment of the present invention. The MEMS structure may be used in any optical switch described herein.

FIG. 39 is a top view of a MEMS structure 124 in an ON state, according to another embodiment of the present invention. This MEMS structure 124 may be used, for example, to translate a coupling frustrator. The top 3900 of the MEMS structure 124 is shown in outline only, to reveal components below the top, including an end portion 110 of the waveguide 106. An arrow 3902 indicates a path taken by light as the light couples from the waveguide 104 to the waveguide 106. The top 3900 may be perforated to permit air to flow through the perforations as the top translates, to reduce friction with the air.

Waveguides and/or MEMS structures described herein may alternatively be made of aluminum nitride, depending on design wavelengths of the optical switch. MEMS structures described herein may alternatively be made of scandium aluminum nitride or various metals.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or," unless otherwise indicated.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. An optical switch having a design wavelength, the optical switch comprising:
   a photonic chip;
   a first input/output port comprising a first optical waveguide disposed on the photonic chip;
   a second input/output port comprising a second optical waveguide, distinct from the first optical waveguide, and disposed on the photonic chip, such that a first end portion of the second optical waveguide is disposed proximate a medial portion of the first optical waveguide;
   a MEMS structure disposed on the photonic chip and having a translatable portion configured to translate in response to a control signal; and
   a translatable optical component comprising either: (a) the medial portion of the first optical waveguide or (b) the first end portion of the second optical waveguide;
   wherein the translatable portion of the MEMS structure is mechanically coupled to, and configured to thereby translate, the translatable optical component between at least a first position and a second position, wherein in the first position, the medial portion of the first optical waveguide and the first end portion of the second optical waveguide are sufficiently proximate to evanescently and directly couple with each other with a coupling efficiency of at least about 85% at the design wavelength, and in the second position, the medial portion of the first optical waveguide and the first end portion of the second optical waveguide are sufficiently spaced apart to evanescently and directly couple with each other with a coupling efficiency of at most about 10% at the design wavelength.

2. An optical switch according to claim 1 wherein:
   when the translatable optical component is in the first position, the first input/output port is optically coupled to the second input/output port via a single evanescent coupling, the single evanescent coupling being between the medial portion of the first optical waveguide and the first end portion of the second optical waveguide; and
   either: (a) the medial portion of the first optical waveguide or (b) the first end portion of the second optical waveguide is configured to translate.

3. An optical switch according to claim 2, wherein:
   the optical switch has an outer boundary that defines a smallest-sized rectangular area that includes the translatable optical component and the MEMS structure;
   the first and second input/output ports are disposed outside the outer boundary;
   each end of the first optical waveguide is disposed outside the outer boundary;
   the medial portion of the first optical waveguide is disposed within the outer boundary;
   the first end portion of the second optical waveguide is disposed within the outer boundary;
   a second end of the second optical waveguide, opposite the first end portion, is disposed outside the outer boundary; and the MEMS structure is disposed within the outer boundary.

4. An optical switch according to claim 3, wherein the translatable optical component comprises the medial portion of the first optical waveguide.

5. An optical switch as defined by claim 4, wherein:
in both the first and second positions, the medial portion of the first optical waveguide is registered above, as viewed normal to the photonic chip, the first end portion of the second optical waveguide; and
the medial portion of the first optical waveguide is configured to translate, relative to the photonic chip, in a plane that intersects the first end portion of the second optical waveguide.

6. An optical switch as defined by claim 5, wherein the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

7. An optical switch as defined by claim 5, wherein the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

8. An optical switch according to claim 4, wherein:
in both the first and second positions, the medial portion of the first optical waveguide is laterally displaced, as viewed normal to the photonic chip, from the first end portion of the second optical waveguide; and
the medial portion of the first optical waveguide is configured to translate in a plane that does not intersect the first end portion of the second optical waveguide.

9. An optical switch according to claim 8, wherein the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

10. An optical switch according to claim 8, wherein the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

11. An optical switch according to claim 3, wherein the translatable optical component comprises the first end portion of the second optical waveguide.

12. An optical switch according to claim 11, wherein:
in both the first and second positions, the first end portion of the second optical waveguide is registered above the medial portion of the first optical waveguide; and
the first end portion of the second optical waveguide is configured to translate, relative to the photonic chip, in a plane that intersects the medial portion of the first optical waveguide.

13. An optical switch as defined by claim 12, wherein the medial portion of the first optical waveguide and the first end portion of the second optical waveguide are configured such that, when the medial portion of the first optical waveguide is in the first position, the medial portion of the first optical waveguide resonantly optically couples with the first end portion of the second optical waveguide with a coupling efficiency of at least about 85% at the design wavelength.

14. An optical switch as defined by claim 12, wherein the medial portion of the first optical waveguide and the first end portion of the second optical waveguide are configured such that, when the medial portion of the first optical waveguide is in the first position, the medial portion of the first optical waveguide adiabatically optically couples with the first end portion of the second optical waveguide with a coupling efficiency of at least about 85% at the design wavelength.

* * * * *